United States Patent
Miyatake et al.

(10) Patent No.: US 12,381,633 B2
(45) Date of Patent: Aug. 5, 2025

(54) OPTICAL POWER SUPPLY SYSTEM, OPTICAL POWER SUPPLY METHOD AND POWER RECEIVING OPTICAL COMMUNICATION APPARATUS

(71) Applicant: Nippon Telegraph and Telephone Corporation, Tokyo (JP)

(72) Inventors: Ryo Miyatake, Musashino (JP); Hiroaki Katsurai, Musashino (JP); Tomoaki Yoshida, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 271 days.

(21) Appl. No.: 18/265,334

(22) PCT Filed: Dec. 15, 2020

(86) PCT No.: PCT/JP2020/046761
§ 371 (c)(1),
(2) Date: Jun. 5, 2023

(87) PCT Pub. No.: WO2022/130505
PCT Pub. Date: Jun. 23, 2022

(65) Prior Publication Data
US 2024/0056198 A1 Feb. 15, 2024

(51) Int. Cl.
*H04B 10/80* (2013.01)
(52) U.S. Cl.
CPC ................ *H04B 10/807* (2013.01)
(58) Field of Classification Search
None
See application file for complete search history.

(56) References Cited

U.S. PATENT DOCUMENTS

2002/0012495 A1  1/2002  Sasai et al.
2005/0226625 A1*  10/2005  Wake ............... H04B 10/25753
                                                        398/115

(Continued)

FOREIGN PATENT DOCUMENTS

JP  2002-217873  8/2002
JP  2010-193374  9/2023

OTHER PUBLICATIONS

Matsuura et al., "Bidirectional Radio-Over-Fiber Systems Using Double-Clad Fibers for Optically Powered Remote Antenna Units", Feb. 2015, IEEE Photonics Journal, vol. 7, No. 1, 10 pages (Year: 2015).*

(Continued)

*Primary Examiner* — David W Lambert
(74) *Attorney, Agent, or Firm* — Fish & Richardson P.C.

(57) ABSTRACT

An optical power supply system comprising: a power supply optical communication device that supplies power using an optical signal for power supply; and a power reception optical communication device that is driven by power obtained from the optical signal for power supply transmitted from the power supply optical communication device, wherein the power supply optical communication device includes an optical power supply unit that transmits the optical signal for power supply to the power reception optical communication device, and an optical signal generation unit that converts a continuous wave used for frequency conversion of a radio signal received by the power reception optical communication device into an optical signal and transmits the optical signal to the power reception optical communication device, the power reception optical communication device includes a photoelectric conversion unit that converts the optical signal transmitted from the power supply optical communication device into an electric signal of a continuous wave, and an external transmission/

(Continued)

reception unit for performing frequency conversion on the radio signal transmitted from the external device.

18 Claims, 12 Drawing Sheets

(56) References Cited

U.S. PATENT DOCUMENTS

2009/0016715 A1\* 1/2009 Furey ................... H04B 10/807
 398/38
2018/0083715 A1\* 3/2018 Greene ................ H04B 10/807

OTHER PUBLICATIONS

Kohno et al., "Current Status and the Future of Software Radio," Transactions of the Institute of Electronics, Information and Communication Engineers B, Jul. 2001, J84-B(7):1112-1119, 16 pages (with machine translation).

Matsuura et al., "Bidirectional Radio-Over-Fiber Systems Using Double-Clad Fibers for Optically Powered Remote Antenna Units," IEEE Photonics Journal, Feb. 2015, 7(1), 10 pages.

\* cited by examiner

OPTICAL POWER SUPPLY SYSTEM, OPTICAL POWER SUPPLY METHOD AND POWER RECEIVING OPTICAL COMMUNICATION APPARATUS

CROSS-REFERENCE TO RELATED APPLICATIONS

This application is a National Stage application under 35 U.S.C. § 371 of International Application No. PCT/JP2020/046761, having an International Filing Date of Dec. 15, 2020.

The disclosure of the prior application is considered part of the disclosure of this application, and is incorporated by reference in its entirety into this application.

TECHNICAL FIELD

The present invention relates to an optical power supply system, an optical power supply method, and optical power supply device.

BACKGROUND ART

Conventionally an optical power supply system to show for PTL 1 is suggested. In the optical power supply system shown in PTL 1, power is supplied from an OLT (Optical Line Terminal: a subscriber line terminal station device) for transmitting an optical signal for power supply (hereinafter referred to as "power supply light") to an ONU (Optical Network Unit: a subscriber line terminal equipment), when the ONU receives the optical signal. In the optical power supply system shown in PTL 1, the same wavelength is used for the optical signal used for optical power supply and the optical signal for communication, thereby eliminating the need for expensive optical multiplexer and optical demultiplexer used for separating wavelengths for power supply and communication. Therefore, the optical power supply system can suppress configuration cost.

FIG. 12 shows a conventional configuration of an ONU using power obtained by optical power supply from an OLT as a power source. As shown in FIG. 12, an OLT 150 and an ONU 200 is connected via an optical transmission path 300. The ONU 200 communicates with an external device 400 by radio. The OLT 150 transmits an optical signal used for optical power supply and an optical signal for communication to the ONU 200. The ONU 200 includes a photoelectric conversion unit 201, a photoelectric conversion unit 202, a power storage unit 203, a modulation/demodulation unit 204, an antenna 205, an oscillator 206, a mixer 207, a level detection unit 208, a preamble detection unit 209, and an optical signal generation unit 210. The modulating/demodulating unit 204, the oscillator 206, the level detecting unit 208 and the preamble detecting unit 209 are in a sleep state when they are not used.

The ONU 200 supplies power stored in the power storage unit 203 to a modulation/demodulation unit 204, an oscillator 206, a level detection unit 208, and a preamble detection unit 209. As a result, the modulation/demodulation unit 204, the oscillator 206, the level detection unit 208 and the preamble detection unit 209 are switched from the sleep state to the start state. The oscillator 206 generates an electric signal of a continuous wave and outputs it to the mixer 207. The mixer 207 frequency-converts a radio signal received via the antenna 205 and transmitted from the external device 400 by using the continuous wave output from the oscillator 206. An oscillator 206 and a level detector 208 included in the ONU 200 are always activated in preparation for the arrival of an irregular radio signal transmitted from an external device 400. Further, as shown in FIG. 1 to FIG. 3, in NPL 1, since it is general to provide an oscillator in a receiver for receiving a radio signal, the power supplied to the oscillator is always consumed.

CITATION LIST

Patent Literature

[PTL 1] Japanese Patent Application Laid-open No. 2010-193374

Non Patent Literature

[NPL 1] Ryuji Kohno, Shinichiro Haruyama, "The present situation and future", Small Collection of Papers on Software Wireless Implementation Techniques and Their Applications, IEICE Transactions on Electronics, Information and Communication Engineers B, Vol. J84-B No. 7 PP. 1112-1119 July 2001.

SUMMARY OF INVENTION

Technical Problem

In the ONU driven by the power obtained by the optical power supply from the OLT as described above as a power source, sufficient power for always driving the entire ONU 200 cannot be provided only by the optical power supply. Therefore, in the prior art, the oscillator 206 and the level detector 208 provided in the ONU 200 are always activated as described above, while the modulation/demodulation section 204 and the preamble detector 209 are in a sleep state for reducing power consumption. In an ONU which is driven by power obtained by optical power supply from an OLT as a power source, further reduction of power consumption is desired to maintain a communication available time. Such a problem is not limited to the ONU, but is common to all the power reception optical communication devices driven by power obtained from the optical signal for power supply.

In view of the foregoing circumstances, an objective of the present invention is to provide a technique for reducing the power consumption of power reception optical communication devices that are driven by power obtained by optical power supply as a power source.

Solution to Problem

An aspect of the present invention is an optical power supply system includes:
  a power supply optical communication device that supplies power using an optical signal for power supply;
  and a power reception optical communication device that is driven by power obtained from the optical signal for power supply transmitted from the power supply optical communication device;
  wherein the power supply optical communication device includes:
  an optical power supply unit that transmits the optical signal for power supply to the power reception optical communication device;
  and an optical signal generation unit that converts a continuous wave used for frequency conversion of a radio signal received by the power reception optical communication device into an optical signal and transmits the optical signal to the power reception optical communication device;

and the power reception optical communication device includes: a photoelectric conversion unit that converts the optical signal transmitted from the power supply optical communication device into an electric signal of a continuous wave; and an external transmission/reception unit for performing frequency conversion on the radio signal transmitted from the external device.

An aspect of the present invention is an optical power supply method performed by a power supply optical communication device that supplies power using an optical signal for power supply and a power reception optical communication device that is driven by power obtained from the optical signal for power supply transmitted from the power supply optical communication device;

wherein the power supply optical communication device transmits the optical signal for power supply to the power reception optical communication device, converts a continuous wave used for frequency conversion of a radio signal received by the power reception optical communication device into an optical signal, and transmits the optical signal to the power reception optical communication device;

and the power reception communication device converts the optical signal transmitted from the power supply optical communication device into an electric signal of a continuous wave, and performs frequency conversion on a radio signal transmitted from an external device by using the electric signal of the continuous wave.

An aspect of the present invention is a power reception optical communication device in an optical power supply system including a power supply optical communication device that supplies power using a power supply optical signal and a power reception optical communication device that is driven by power obtained from the power supply optical signal transmitted from the power supply optical communication device comprising: a photoelectric conversion unit that converts a continuous optical signal transmitted from the optical power supply system, used for frequency conversion a radio signal received in the power reception optical communication device, into the electric signal of the continuous wave;

and an external transmission/reception unit for performing frequency conversion on a radio signal transmitted from an external device by using the electric signal of the continuous wave.

Advantageous Effects of Invention

According to the present invention, it is possible to reduce power consumption of a power reception optical communication device that is driven by power obtained by power supply as a power source.

DESCRIPTION OF EMBODIMENTS

The following describes an embodiment of the present invention with reference to the drawings.

Overview

An overview of an optical power supply system according to the present invention will be described.

In an optical communication system for performing optical power supply, when there is no data to be transmitted to a power reception optical communication device (hereinafter referred to as "transmission data"), a power supply optical communication device, via a line for transmitting the power supply light (hereinafter referred to as "power supply line"), transmits the power supply light to the power reception optical communication device, while via a line for transmitting/receiving data to/from the power reception optical communication device (hereinafter referred to as "communication line"), transmits an optical signal of a continuous wave (hereinafter referred to as "continuous wave light") for frequency conversion on a radio signal received in the power reception optical communication device to the power reception optical communication device. The power reception optical communication device receives the continuous wave light and converts the received continuous wave light into an electric signal of a continuous wave. The power reception optical communication device performs frequency conversion of a radio signal transmitted from an external device by using the electric signal of the continuous wave.

With such a configuration, since it is not necessary to generate a continuous wave used for frequency conversion in the power reception optical communication device, power consumption of the power reception optical communication device driven by power obtained by power supply as a power source can be reduced.

Hereinafter, a specific configuration will be described, using multiple embodiments as examples.

First Embodiment

Figure 1:
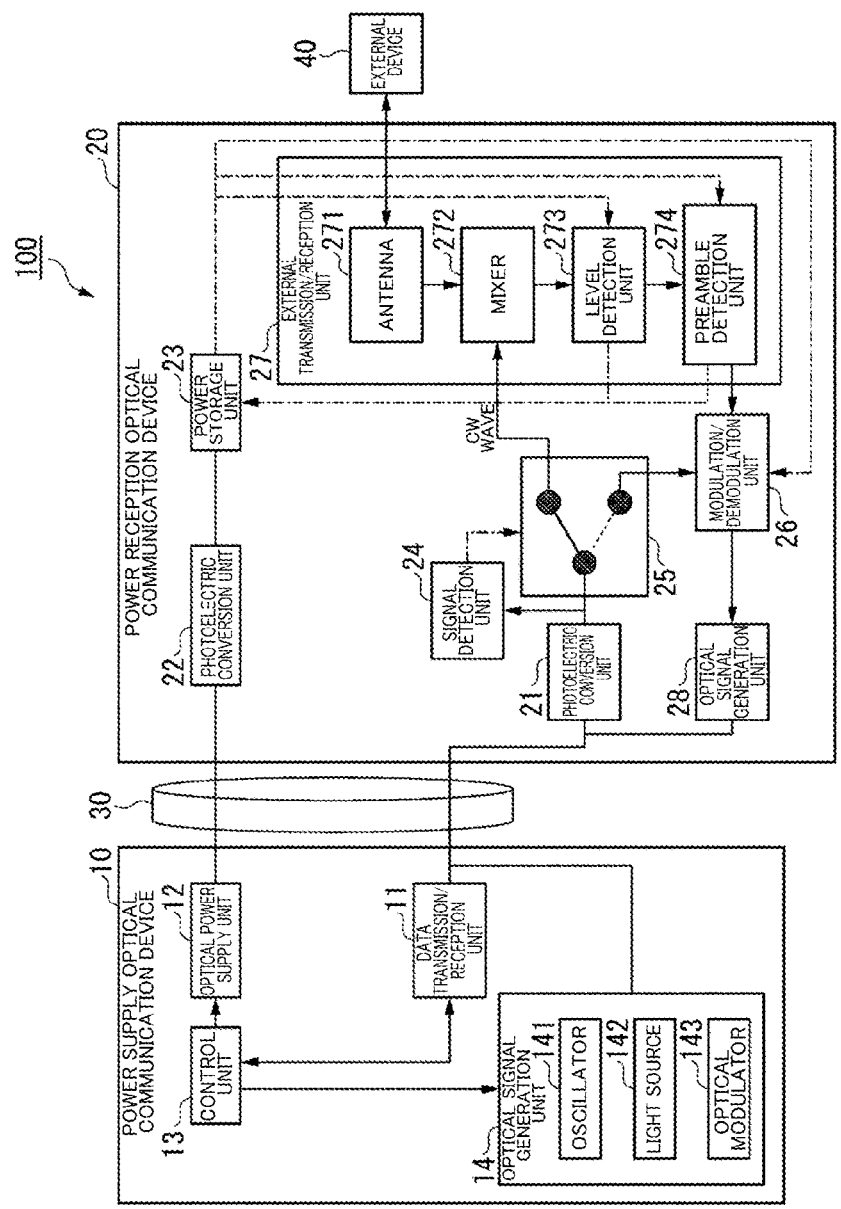
FIG. 1 is a diagram illustrating an exemplary configuration of an optical power supply system according to a first embodiment.

FIG. 1 illustrates an example of a configuration of an optical power supply system 100 according to a first embodiment. The optical power supply system 100 includes a power supply optical communication device 10 and a power reception optical communication device 20. The power supply optical communication device 10 and the power reception optical communication device 20 are connected communicably via an optical transmission line 30. The power supply optical communication device 10 and the power reception optical communication device 20 are connected via the optical transmission line 30, thereby enabling communication between the power supply optical communication device 10 and the power reception optical communication device 20. For example, the power supply optical communication device 10 and the power reception optical communication device 20 are connected via a power supply line and a communication line, respectively.

The power supply line and the communication line may be physically provided in the same fiber or may be provided in separate independent fibers, respectively. That is, the same fiber may be physically shared between the optical signal for communication and the optical signal for power supply, or another independent fiber may be used. In the case where the same fiber is shared between the optical signal for communication and the optical signal for power supply, there is a method of wavelength multiplexing the optical signal for communication and the optical signal for power supply by using different frequency bands. In FIG. 1, the power supply optical communication device 10 and the power reception optical communication device 20 have a single star topology configuration. Hereinafter, a direction from the power supply optical communication device 10 to the power reception optical communication device 20 is defined as a downward direction, and a direction from the power reception optical communication device 20 to the power supply optical communication device 10 is defined as an upward direction.

Although FIG. 1 shows one power reception optical communication device 20, the optical power supply system 100 may include a plurality of power reception optical communication devices 20. When a plurality of power reception optical communication devices 20 are provided in the optical power supply system 100, an optical splitter is provided between the power supply optical communication device 10 and the plurality of power reception optical communication devices 20. The optical splitter branches the optical signal transmitted from the power supply optical communication device 10 and transmits it to each power reception optical communication device 20. The optical splitter multiplexes the optical signals transmitted from each power reception optical communication device 20 and transmits the multiplexed optical signals to the power supply optical communication device 10.

The power supply optical communication device 10 is, for example, an OLT. The power supply optical communication device 10 includes a data transmission/reception unit 11, an optical power supply unit 12, a control unit 13, and an optical signal generation unit 14.

The data transmission/reception unit 11 performs transmission and reception of data between the power reception optical communication device 20. The data transmission/reception unit 11 is, for example, an optical transceiver, and includes therein a light source for emitting light of a specific wavelength. The data transmission/reception unit 11 modulates light emitted from a light source provided inside on the basis of an electric signal of transmission data given from the control unit 13 according to control of the control unit 13, and thereby, converts to optical signal of transmission data (hereinafter referred to as "communication light"), and transmits the converted communication light to an optical transmission line 30.

The data transmission/reception unit 11 includes therein, for example, an O/E (Optical/Electrical) converter such as a photodetector. The data transmission/reception unit 11 receives an optical signal of data transmitted through the optical transmission line 30, converts the received optical signal into an electrical signal with an O/E converter, and outputs the signal to the electrical signal processing unit 13.

The optical power supply unit 12 is provided with a light source for emitting light to the inside, and generates power supply light by the light source and transmits it to the optical transmission line 30. Thus, the optical power supply unit 12 transmits the power supply light to the power reception optical communication device 20.

The control unit 13 controls operations of the data transmission/reception unit 11, the optical power supply unit 12, and the optical signal generation unit 14. For example, the control unit 13 fetches transmission data from the outside. The control unit 13 generates data of an electric signal from the fetched transmission data, and outputs the generated data of the electric signal to a data transmission/reception unit 11.

The control unit 13 fetches the data of the electric signal outputted from the data transmission/reception unit 11 and outputs the fetched data to the outside. When there is no transmission data, the control unit 13 controls the optical signal generation unit 14 to transmit the continuous wave light. The control unit 13 causes the optical power supply unit 12 to output power supply light.

The optical signal generation unit 14 generates continuous wave light according to the control of the control unit 13. The optical signal generation unit 14 includes an oscillator 141, a light source 142, and an optical modulator 143. The oscillator 141 generates a continuous wave (CW: Continuous Wave) of an electric and outputs to the optical modulator 143. The light source 142 emits light of a specific wavelength. The optical modulator 143 generates continuous wave light by modulating the light emitted from the light source 142 by using the electric signal of the continuous wave, and transmits the generated continuous wave light to the optical transmission line 30.

As described above, the power-feeding optical communication apparatus 10 according to the present embodiment transmits communication light to the power-receiving optical communication apparatus 20 by the data transmission/reception unit 11 when there is transmission data. When there is no transmission data, the power supply optical communication device 10 transmits continuous wave light to the power reception optical communication device 20 by an optical signal generation unit 14.

The power reception optical communication device 20 is driven by power supplied from the power supply optical communication device 10 as a power source. The power reception optical communication device 20 is, for example, an ONU. The power reception optical communication device 20 includes a photoelectric conversion unit 21, a photoelectric conversion unit 22, a power storage unit 23, a signal detection unit 24, A route switching unit 25, a modulation/demodulation unit 26, an external transmission/reception unit 27, and an optical signal generation unit 28. When not in use, the modulation/demodulation unit 26 and the external transmission/reception unit 27 are in a sleep state.

The photoelectric conversion unit 21 receives an optical signal transmitted through the communication line from the data transmission/reception unit 11, converts the received optical signal into an electrical signal, and outputs the signal to the signal detection unit 24 and the route switching unit 25. The photoelectric conversion unit 21 is, for example, an O/E converter such as a photodetector.

The photoelectric conversion unit 22 receives an optical signal transmitted through the power supply line from the optical power supply unit 12, converts the received optical signal into an electrical signal, and outputs the signal to the power storage unit 23. The photoelectric conversion unit 22 is, for example, an O/E converter such as a photodetector.

The power storage unit 23 includes a battery therein. The power storage unit 23 stores power of an electric signal in a battery by performing charging processing on the basis of the electric signal output from the photoelectric conversion unit 22. The power storage unit 23 supplies a power supply voltage generated by using the stored power to the modulation/demodulation unit 26 and the external transmission/reception unit 27 in response to an instruction from the signal detection unit 24. As a result, the modulation/demodulation unit 26 and the external transmission/reception unit 27 become operable from the sleep state.

A signal detection unit 24 always monitors the electric signal converted by the photoelectric conversion unit 21, and detects an optical signal indicating transmission of communication light on the basis of the optical signal received via the communication line. Specifically, the signal detection unit 24 does not detect the optical signal received via the communication line as an optical signal indicating transmission of the communication light when detecting a signal of a line spectrum in which the frequency of the electric signal is constant. On the other hand, the signal detection unit 24 detects the optical signal received via the communication line as an optical signal indicating transmission of the communication light when the signal of the line spectrum in which the frequency of the electric signal is constant is not detected.

A signal detection unit 24 switches the output route of the route switching unit 25 according to the detection result. Specifically, when detecting an optical signal indicating transmission of communication light, the signal detection unit 24 controls an output route of the route switching unit 25 to be a first route, and causes the power storage unit 23 to supply power to the modulation/demodulation unit 26. The signal detection unit 24 controls the output route of the route switching unit 25 to be a second route when the optical signal indicating the transmission of the communication light is not detected.

When controlling the route switching unit 25, the signal detection unit 24 may supply power from the power storage unit 23 to a part of the function units of the external transmission/reception unit 27. The first route is a route through which a signal output from the route switching unit 25 is output to the modulation/demodulation unit 26. The second route is a route in which a signal output from the route switching unit 25 is output to a mixer 272 provided in an external transmission/reception unit 27.

The route switching unit 25 is a switch capable of switching an output route according to control of the signal detection unit 24. The route switching unit 25 may be an electric switch or a mechanical switch, as long as the input signal can be output to either the first route or the second route according to the control of the signal detection unit 24, an electrical switch, a mechanical, or a combination of an electrical switch and a mechanical switch may be used. In the following description, the route switching unit 25 is explained as a mechanical switch, as an example.

The modulation/demodulation unit 26 modulates or demodulates the input signal. For example, the modulation/demodulation unit 26 demodulates the data output from the route switching unit 25. For example, the modulation/demodulation unit 26 demodulates the data output from the external transmission/reception unit 27. The modulation/demodulation unit 26 is not supplied with power from the power storage unit 23 when not used, and is in a sleep state.

The external transmission/reception unit 27 is a functional unit operable by power supplied from the power storage unit 23. Therefore, the external transmission/reception unit 27 is in a sleep state when power is not supplied from the power storage unit 23. When power is supplied from the power storage unit 23, the external transmission/reception unit 27 is switched from a sleep state to a start state, and becomes communicable. The transmission/reception unit 27 communicates with an external device 40.

When the external transmission/reception unit 27 is connected to the external device 40 by radio communication means, for example, the Wi-Fi module (Wi-Fi is a registered trademark) or the like is applied, as the external transmission/reception unit 27. The external transmission/reception unit 27 receives data transmitted by the external device 40 at a predetermined constant period, and writes the received data in an unshown storage unit to store the data. An external transmission/reception unit 27 fetches the data outputted from the route switching unit 25 and transmits the fetched data to an external device 40. When an unshown storage unit stores data to be transmitted to the external device, the external transmission/reception unit 27 reads the data from the storage unit, and transmits the read data to the external device 40.

The external device 40 may be, for example, a sensor node such as an IoT (Internet of Things) sensor. The external device 40 is connected to the power reception optical communication device 20 by radio. The external device 40 transmits, for example, data measured by a sensor provided inside to the power reception optical communication device 20 at a predetermined constant cycle. The external device 40 receives data transmitted by the power reception optical communication device 20. A plurality of external devices 40 may be present, and in this case, the plurality of external devices 40 is connected to the power reception optical communication device 20 by radio.

The external transmission/reception unit 27 includes an antenna 271, a mixer 272, a level detection unit 273, and a preamble detection unit 274. The level detection unit 273 and the preamble detection unit 274 included in the external transmission/reception unit 27 are function units operated by power supplied from the power storage unit 23.

The antenna 271 receives the signal of wireless communication transmitted from the terminal station 40.

The mixer 272 performs frequency conversion of a radio signal transmitted from an external device 40 by using an electric signal of the continuous wave (CW wave) output from the route switching unit 25. For example, the mixer 272 multiplies an electric signal of a continuous wave (CW wave) by a radio signal received via the antenna 271 to down-convert the radio signal into a baseband signal.

The level detection unit 273 detects a reception level of the down-converted signal. When the reception level of the detected signal is equal to or higher than a threshold, the level detection unit 273 outputs the down-converted signal to a preamble detection unit 274. On the other hand, when the reception level of the detected signal is less than the threshold, the level detection unit 273 discards the down-converted signal.

A preamble detection unit 274 determines whether or not the signal is to be received on the basis of the preamble of the signal output from the level detection unit 273. When the signal is to be received, the preamble detection unit 274 outputs the signal output from the level detection unit 273 to the modulation/demodulation unit 26. On the other hand, the preamble detection unit 274 discards the signal output from the level detector 273 when the signal is not the signal to be received.

The determination of whether or not the signal is a signal to be received may be determined by whether or not a destination included in the preamble is addressed to a device in the optical power supply system 100. When a destination included in the preamble is addressed to a device in the optical power supply system 100, the preamble detection unit 274 determines that the signal is a signal to be received. When the destination included in the preamble is not addressed to a device in the optical power supply system 100, the preamble detection unit 274 determines that the signal is not a signal to be received.

The level detection unit 273 and the preamble detection unit 274 are not supplied with power from the power storage unit 23 when not used, and are in a sleep state.

Figure 2:
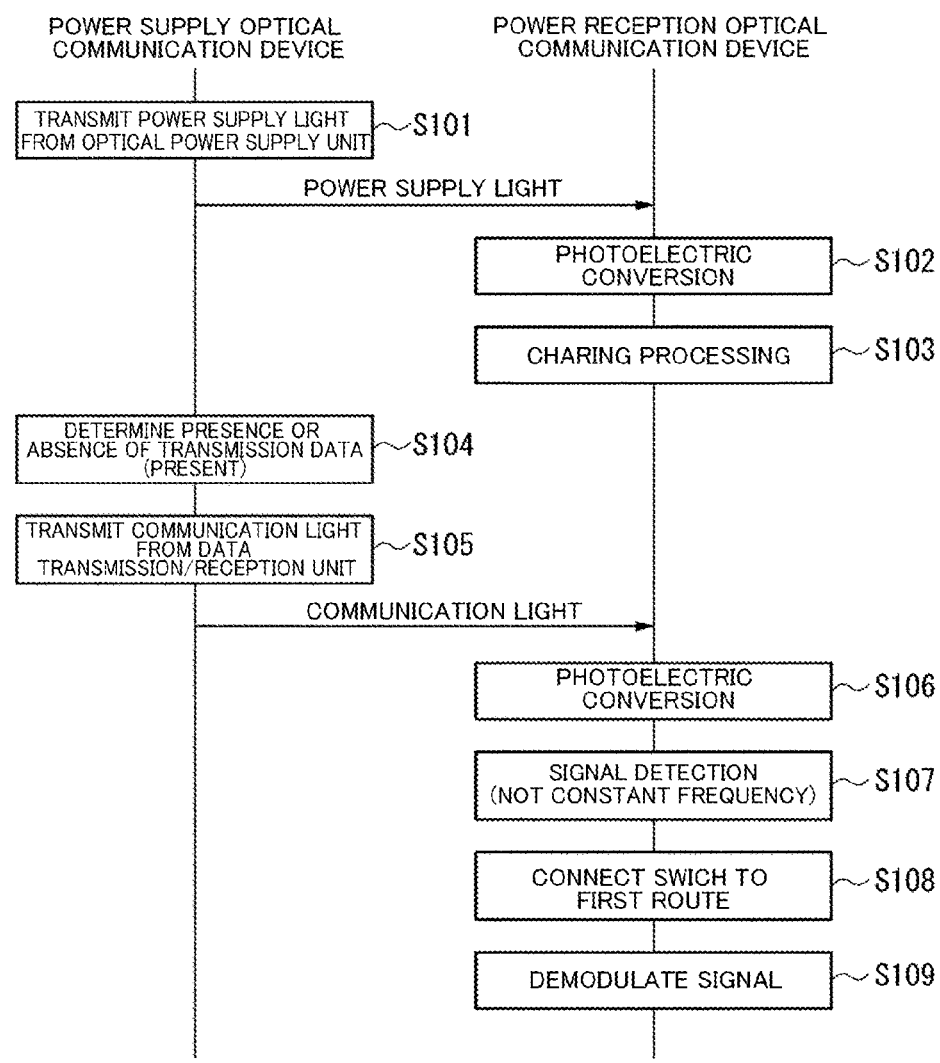
FIG. 2 is a sequence diagram showing a flow of the first processing of the optical power supply system according to the first embodiment.

FIG. 2 is the sequence diagram showing the flow of a first processing of the optical power supply system 100 according to the first embodiment. In the processing shown in FIG. 2, the flow of the processing when there is transmission data in the power supply optical communication device 10 will be described.

An optical power supply unit 12 of the power supply optical communication device 10 generates power supply light by a light source provided inside and transmits the power supply light to an optical transmission line 30 (step S101). The power supply light transmitted from the power supply optical communication device 10 is received by a power reception optical communication device 20 connected via an optical transmission line 30. Specifically, the feeding light transmitted from the optical power supply unit 12 is received by the photoelectric conversion unit 22 of the power reception optical communication device 20 via a power supply line. The photoelectric conversion unit 22 converts the received optical signal into an electrical signal and outputs the resulting signal to the electrical signal processing unit 23 (step S102).

The power storage unit 23 performs charging processing on the basis of the electric signal output from the photoelectric conversion unit 22 to store the power of the electric signal in a battery (step S103). The processing from the step S101 to the step S103 is continued even while the processing after the step S104 is executed.

The control unit 13 of the power supply optical communication device 10 determines whether transmission data is present or not (step S104). For example, the control unit 13 determines that there is transmission data when the transmission data is fetched from the outside or the transmission data is present in an internal storage unit. On the other hand, the control unit 13 determines that there is no transmission data when the transmission data is not fetched from the outside and when there is no transmission data in the internal storage unit. Here, it is assumed that there is transmission data. In this case, the control unit 13 generates data of an electric signal from the transmission data, and outputs the generated data of the electric signal to the data transmission/reception unit 11.

The data transmission/reception unit 11 generates communication light on the basis of the electric signal of the transmission data output from the control unit 13. The data transmission/reception unit 11 outputs the generated signal light to the optical transmission line 30 (step S105). The communication light transmitted from the power supply optical communication device 10 is received by a power reception optical communication device 20 connected via an optical transmission line 30. More specifically, the communication light transmitted from the data transmission/reception unit 11 is received by the photoelectric conversion unit 21 of the power reception optical communication device 20 via the communication line. The photoelectric conversion unit 21 converts the received optical signal into an electrical signal and outputs the electrical signal to the signal detection unit 24 and the route switching unit 25 (step S106).

The signal detection unit 24 acquires the electric signal output from the photoelectric conversion unit 21. A signal detection unit 24 always monitors the input electric signal and detects an optical signal indicating transmission of communication light (step S107). It is determined that the signal detection unit 24 detects that the frequency of the input electric signal is not a constant line spectrum. In this case, the signal detection unit 24 detects the optical signal received via the communication line as an optical signal indicating transmission of communication light. Then, the signal detection unit 24 controls the output route of the route switching unit 25 to be the first route, and to supply power from the power storage unit 23 to the modulation/demodulation unit 26 (step S108).

For example, when the output route of the route switching unit 25 is the second route, the signal detection unit 24 switches the route so that the output route of the route switching unit 25 is the first route. On the other hand, when the output route of the route switching unit 25 is the first route, the signal detection unit 24 does not switch the output route of the route switching unit 25. The output route of the route switching unit 25 is controlled to be the first route, and the electric signal inputted to the route switching unit 25 is outputted to the modulation/demodulation unit 26.

Further, the signal detection unit 24 instructs the power storage unit 23 to supply power to the modulation/demodulation unit 26. The power storage unit 23 supplies power to the modulation/demodulation unit 26 in response to an instruction from the signal detection unit 24. Thus, the modulation/demodulation unit 26 is switched from the sleep state to the start state. The modulation/demodulation unit 26 demodulates the input electrical signal (step S109).

Figure 3:
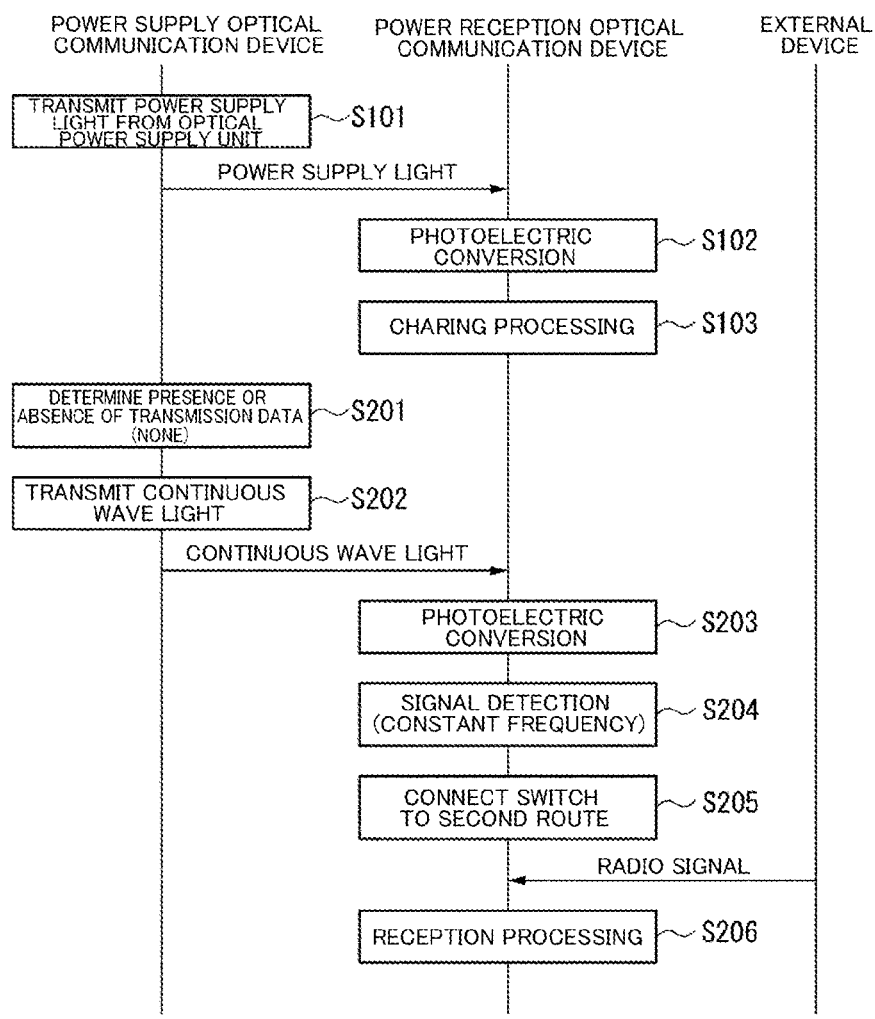
FIG. 3 is a sequence diagram showing a flow of second processing of the optical power supply system according to the first embodiment.

FIG. 3 is the sequence diagram showing the flow of a second processing of the optical power supply system 100 according to the first embodiment. In the processing shown in FIG. 3, the flow of the processing when there is no transmission data in the power supply optical communication device 10 will be described. In FIG. 3, processing similar to that in FIG. 2 is designated by the same reference numerals as in FIG. 2, and will not be described.

At the same time or after the processing from the step S101 to the step S103, the control unit 13 of the power supply optical communication device 10 determines the presence or absence of transmission data (step S201). Here, it is assumed that there is no transmission data. In this case, the control unit 13 controls the optical signal generation unit 14 to output continuous wave light from the optical signal generation unit 14. The optical signal generation unit 14 generates continuous wave light according to the control of the control unit 13, and transmits the generated continuous wave light to the power reception optical communication device 20 via the optical transmission line 30 (step S202).

Specifically, the oscillator 141 generates an electric signal of a continuous wave and outputs it to the optical modulator 143. The optical modulator 143 modulates the light emitted from the light source 142 on the basis of the electric signal of the continuous wave to generate the continuous wave light. The optical modulator 143 transmits the generated continuous wave light to the power reception optical communication device 20 on the optical transmission line 30. Thus, the power supply optical communication device 10 transmits the continuous wave light to the power reception optical communication device 20 via the optical transmission line 30 while there is no transmission data.

The continuous wave light transmitted from the power supply optical communication device 10 is received by a power reception optical communication device 20 connected via an optical transmission line 30. Specifically, the continuous wave light transmitted from the data transmission/reception unit 11 is received by the photoelectric conversion unit 21 of the power reception optical communication device 20 via the communication line. The photoelectric conversion unit 21 converts the received continuous wave light into an electrical signal and outputs the electrical signal to the signal detection unit 24 and the route switching unit 25 (step S203).

The signal detection unit 24 acquires the electric signal output from the photoelectric conversion unit 21. A signal detection unit 24 always monitors the input electric signal and detects an optical signal indicating transmission of communication light (step S204). It is assumed that the signal detection unit 24 detects that the frequency of the input electric signal is a constant line spectrum. In this case, the signal detection unit 24 does not detect the optical signal received via the communication line as an optical signal indicating transmission of communication light. Then, the signal detection unit 24 controls the output route of the route switching section 25 to be the second route (step S205).

For example, when the output route of the route switching unit 25 is a first route, the signal detection unit 24 switches the route so that the output route of the route switching unit 25 is a second route. On the other hand, when the output route of the route switching unit 25 is the second route, the signal detection unit 24 does not switch the output route of the route switching unit 25. The output route of the route switching unit 25 is controlled to be the second path, and thereby the electric signal of the continuous wave input to the route switching unit 25 is output to the mixer 272.

It is assumed that the radio signal transmitted from the external device 40 is received by the antenna 271. In this case, the external transmission/reception unit 27 performs reception processing (step S206). Specifically, the mixer 272 down-converts the radio signal received via the antenna 271 by using the electric signal of the continuous wave (CW wave) output from the route switching unit 25. The mixer 272 outputs the down-converted signal to the level detection unit 273. Thereafter, the radio signal is received by processing of the level detector 273, the preamble detection unit 274, and the modulation/demodulation unit 26.

Figure 4:
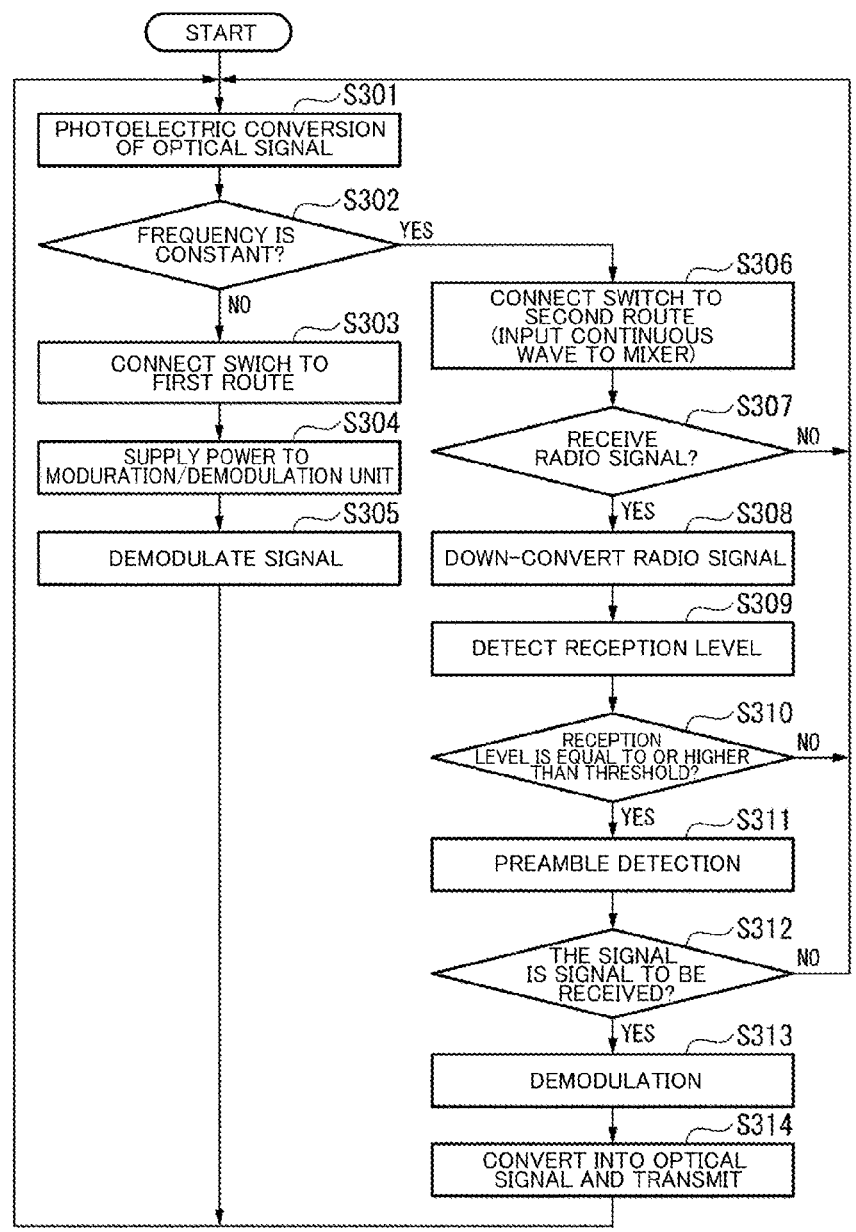
FIG. 4 is a flowchart illustrating a flow of processing of the power reception optical communication device according to the first embodiment.

FIG. 4 is a flowchart illustrating a flow of processing of the power reception optical communication device 20 according to the first embodiment. In the flow chart shown in FIG. 4, the processing of the optical signal received by the photoelectric conversion unit 21 will be mainly described.

The photoelectric conversion unit 21 converts the received optical signal into an electrical signal and outputs the electrical signal to the signal detection unit 24 and the route switching unit 25 (step S301). The signal detection unit 24 always monitors the input electric signal and determines whether the frequency of the electric signal is constant or not (step S302). When the frequency of the electric signal is not constant (step S302: NO), a signal detection unit 24 controls the output route of the route switching unit 25 to be the first route (step S303).

Further, the signal detection unit 24 instructs the power storage unit 23 to supply power to the modulation/demodulation unit 26. The power storage unit 23 supplies power to the modulation/demodulation unit 26 in response to an instruction from the signal detection unit 24 (step S304). The modulation/demodulation unit 26 demodulates the input electrical signal (step S305). Thereafter, the processing returns to step S301.

In the processing of the step S302, when the frequency of the electric signal is constant (step S302: YES), the signal detection unit 24 controls the output route of the route switching unit 25 to be the second route (step S306). When the output route of the route switching unit 25 becomes the second route, the electric signal of the continuous wave is input to the mixer 272. The power reception optical communication device 20 determines whether a radio signal is received from an external device 40 or not (step S307).

When the radio signal is not received from the external device 40 (step S307: NO), the power reception optical communication device 20 executes the processing of the step S301.

When the radio signal is received from the external device 40 (step S307: Yes), the mixer 272 down-converts the received radio signal by using the electric signal of the continuous wave (step S308). The mixer 272 outputs the down-converted signal to the level detection unit 273.

The level detection unit 273 detects the reception level of the input signal (step S309). A level detection unit 273 determines whether or not the reception level of the input signal is equal to or higher than a threshold (step S310). When the reception level of the signal is less than the threshold value (step S310: No), the power reception optical communication device 20 executes the processing of the step S301.

When the reception level of the signal is equal to or higher than the threshold value (step S310: YES), the level detection unit 273 outputs the input signal to the preamble detection unit 274. At this point of time, the preamble detection unit 274 is in a sleep state. Therefore, the level detection unit 273 causes the power storage unit 23 to supply power to the preamble detection unit 274. The power storage unit 23 supplies power to the preamble detection unit 274 in response to an instruction from the level detection unit 273. Thus, the preamble detection unit 274 starts from the sleep state.

The preamble detection unit 274 detects a preamble of the signal output from the level detection unit 273 (step S311). A preamble detection unit 274 determines whether or not the signal is a signal to be received on the basis of the detected preamble (step S312). When the signal is not a signal to be received (step S312: NO), the preamble detection unit 274 discards the signal outputted from the level detection unit 273. Thereafter, the determination unit 20 executes the processing of step S301.

When the signal is a signal to be received (step S312: Yes), the preamble detection unit 274 outputs the signal outputted from the level detection unit 273 to the modulation/demodulation unit 26. At this point of time, the modulation/demodulation unit 26 is in a sleep state.

Therefore, the preamble detection unit 274 supplies power from the power storage unit 23 to the modulation/demodulation unit 26. The power storage unit 23 supplies power to the modulation/demodulation unit 26 in response to an instruction from the preamble detection unit 274. Thus, the modulation/demodulation unit 26 is started from the sleep state.

A modulation/demodulation unit 26 demodulates the signal outputted from the preamble detection unit 274 (step S313). The modulation/demodulation unit 26 outputs the demodulated signal to an optical signal generation unit 28. The optical signal generation unit 28 converts the signal output from the modulation/demodulation unit 26 into an optical signal and transmits the optical signal to the power supply optical communication device 10 via the optical transmission line 30.

According to the optical power supply system 100 configured as described above, the power supply optical communication device 10 transmits the continuous wave light generated by the oscillator 141 to the power reception optical communication device 20 when there is no transmission data to the power reception optical communication apparatus 20. The power reception optical communication device 20 performs frequency conversion of a radio signal received from an external device 40 by using the continuous wave transmitted from the power supply optical communication device 10. Thus, it is not necessary to generate a continuous wave for frequency conversion in the power reception optical communication device 20. Therefore, power for generating continuous waves can be suppressed. Therefore, it is possible to reduce wasteful power consumption.

Further, the power reception optical communication device 20 converts an optical signal input via the communication line into an electric signal, and detects an optical signal indicating transmission of communication light on the basis of a frequency of the electric signal. Thus, it is not necessary to additionally transmit a control signal from the power supply optical communication device 10, and the sleep state can be released at a timing necessary for the power reception optical communication device 20. Therefore, it is possible to reduce wasteful power consumption.

Further, the power reception optical communication device 20 includes a route switching unit 25 for outputting an electric signal based on the optical signal input via the communication line to a route toward the mixer 272 when the optical signal input via the communication line is an optical signal indicating transmission of continuous wave light. Thus, the electric signal based on the optical signal input through the communication line can be output to the mixer 272 with a simple configuration.

Second Embodiment

In the first embodiment, a configuration in which the signal detection unit detects an optical signal indicating transmission of communication light transmitted from the power supply optical communication device according to whether or not a line spectrum having a constant frequency of an electric signal is described. In the second embodiment, a configuration in which the signal detection unit detects a specific signal pattern to detect an optical signal indicating transmission of communication light transmitted from the power supply optical communication device will be described. In the second embodiment, the presence or absence of a specific signal pattern is detected by an electric signal.

Figure 5:
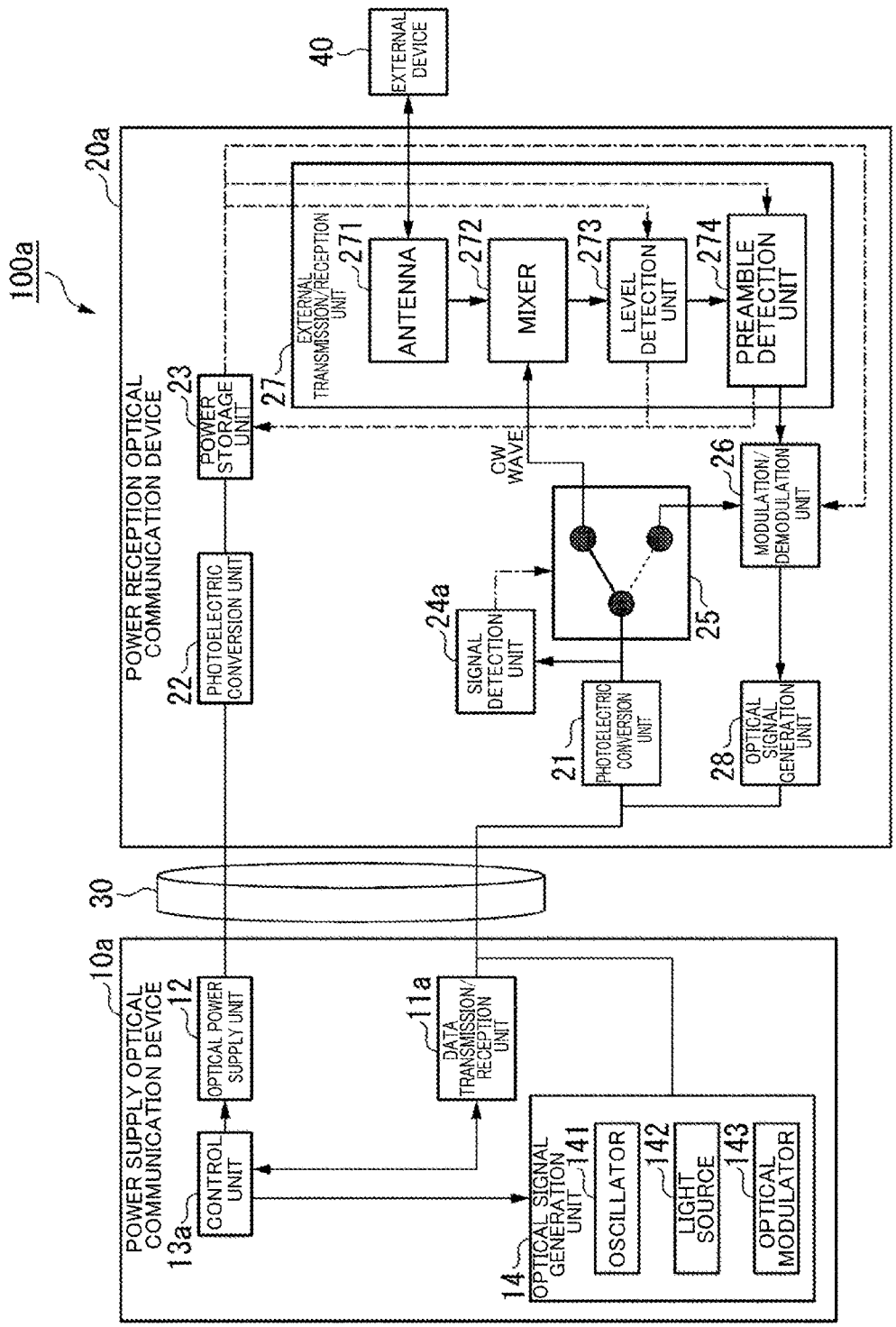
FIG. 5 is a diagram illustrating an example of a system configuration of the optical power supply system according to a second embodiment.

FIG. 5 is a diagram showing an example of a configuration of an optical power supply system 100a in the second embodiment. The optical transmission system 100a includes a power supply optical communication device 10a and a power reception optical communication device 20a. The power supply optical communication device 10a and the power reception optical communication device 20a are connected communicably via an optical transmission line 30. The power supply optical communication device 10a and the power reception optical communication device 20a are connected via the optical transmission line 30, thereby enabling communication between the power supply optical communication device 10a and the power reception optical communication device 20a. For example, the power supply optical communication device 10a and the power reception optical communication device 20a are connected via a power supply line and a communication line, respectively. In FIG. 5, the power supply optical communication device 10a and the power reception optical communication device 20a have a single star type topology configuration.

Although one power reception optical communication device 20a is shown in FIG. 5, the optical power supply system 100a may include a plurality of power reception optical communication devices 20a. When the optical power supply system 100a is provided with a plurality of power reception optical communication devices 20a, an optical splitter is provided between the power supply optical communication device 10a and the plurality of power reception optical communication devices 20a. The optical splitter branches the optical signal transmitted from the power supply optical communication device 10a and transmits it to each power reception optical communication device 20a. The optical splitter multiplexes the communication device 20a and transmits the multiplexed optical signals to the power supply optical communication device 10a.

In a second embodiment, a specific signal pattern predetermined between the power supply optical communication device 10a and the power reception optical communication device 20a is used as an optical signal indicating transmission of communication light. When transmission data are generated, the power supply optical communication device 10a transmits an optical signal of a specific signal pattern to the power reception optical communication device 20a via a communication line for a fixed time. The specific signal pattern is composed of, for example, a combination of blinking of a light source. Then, the power supply optical communication device 10a transmits communication light to the power reception optical communication device 20a via the communication line after transmitting the optical signal of the specific signal pattern.

The power reception optical communication device 20a converts the optical signal received via the communication line into an electric signal and monitors the electric signal. The power reception optical communication device 20a sets the output route of the route switching unit 25 as a first route when the specific signal pattern is not detected, and sets the output route of the route switching unit 25 as a second route when the specific signal pattern is detected. Hereinbelow, a specific configuration will be described.

The power supply optical communication device 10a includes a data transmission/reception unit 11a, an optical power supply unit 12, a control unit 13a, and an optical signal generation unit 14.

The power supply optical communication device 10a has a different configuration from the power supply optical communication device 10 in that the data transmission/reception unit 11a and the control unit 13a are included instead of the data transmission/reception unit 11 and the control unit 13. The power supply optical communication device 10a is similar to the power supply optical communication device 10 in other configurations. Therefore, the description of the entire power supply optical communication device 10a will be omitted and the data transmission/reception unit 11a and the control unit 13a will be described.

The data transmission/reception unit 11a performs transmission and reception of data with the power reception optical communication device 20a. The data transmission/reception unit 11a is, for example, an optical transceiver and is provided with a light source for emitting light of a specific wavelength inside. The data transmission/reception unit 11a transmits communication light to the optical transmission line 30 according to the control of the control unit 13. Further, the data transmission/reception unit 11a transmits an optical signal of a specific signal pattern to the optical transmission line 30 according to the control of the control unit 13.

A control unit 13a controls the operations of the data transmission/reception unit 11a, the optical power supply unit 12 and the optical signal generation unit 14. For example, when there is transmission data, the control unit 13a first makes a data transmission/reception unit 11a transmit an optical signal of a specific signal pattern for a fixed time. The control unit 13a makes the data transmission/reception unit 11a transmit the communication light after passing for a certain period of time. When there is no transmission data, the control unit 13a controls the optical signal generation unit 14 to transmit the continuous wave light. The control unit 13a outputs the power supply light from the optical power supply unit 12.

The power reception optical communication device 20a is driven by power supplied from the power supply optical communication device 10a as a power source. The power reception optical communication device 20a includes a photoelectric conversion unit 21, a photoelectric conversion unit 22, a power storage unit 23, a signal detection unit 24a, a route switching unit 25, a modulation/demodulation unit 26, an external transmission/reception unit 27, and an optical signal generation unit 28.

The power reception optical communication device 20a is different in configuration from the power reception optical communication device 20 in that a signal detection unit 24a is provided in place of the signal detection unit 24. The power reception optical communication device 20a is similar to the power reception optical communication device 20 in other configurations. Therefore, the description of the entire power reception optical communication device 20a will be omitted and the signal detection unit 24a will be described.

A signal detection unit 24a always monitors the electric signal converted by the photoelectric conversion unit 21 and detects an optical signal indicating transmission of communication light. Specifically, the signal detection unit 24a detects an optical signal received via a communication line as an optical signal indicating transmission of communication light when detecting a specific signal pattern. On the other hand, when the specific signal pattern cannot be detected, the signal detection unit 24a does not detect the optical signal received via the communication line as the optical signal indicating the transmission of the communication light.

The signal detection unit 24a switches the output route of the route switching unit 25 according to the detection result. The signal detection unit 24a is, for example, a trigger detector. Communication light is transmitted from the power supply optical communication device 10a after an optical signal of a specific signal pattern is transmitted. Thus, the transmission data can be output to an appropriate output route by controlling the output route of the route switching unit 25 after the signal detection unit 24a detects the specific signal pattern. The transmission data are transmitted for a prescribed period after the signal detection unit 24a detects the specific signal pattern. Therefore, even if a specific signal pattern is not detected during the predetermined period, the signal detection unit 24a may detect an optical signal received via a communication line during the predetermined period as an optical signal indicating transmission of communication light. With this configuration, the output route of the route switching unit 25 is not switched immediately after the specific signal pattern is not detected.

Figure 6:
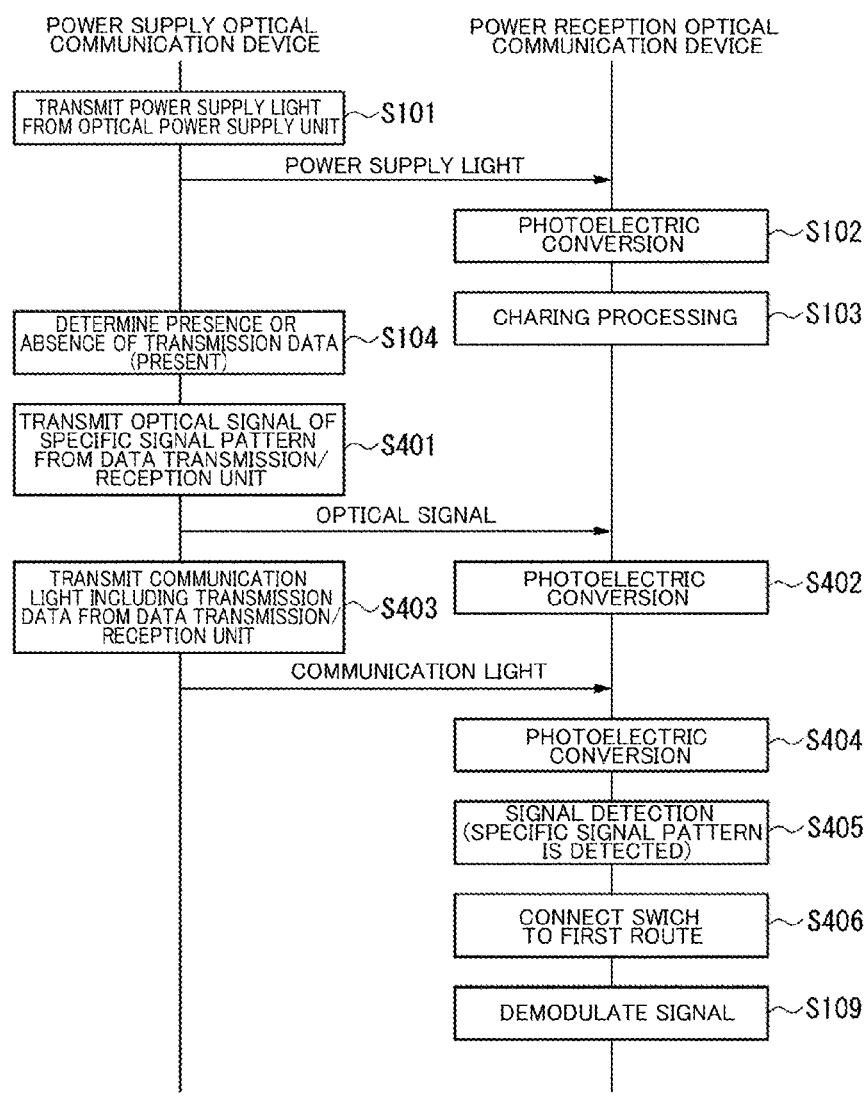
FIG. 6 is the sequence diagram showing the flow of first processing of the optical power supply system according to the second embodiment.

FIG. 6 is the sequence diagram showing the flow of a processing of the optical power supply system 100a according to the second embodiment. In the processing shown in FIG. 6, the flow of the processing when there is transmission data in the power supply optical communication device 10 will be described. In FIG. 6, processing similar to that in FIG. 2 is designated by the same reference numerals as in FIG. 2, and will not be described.

It is assumed that processing from the step S101 to the step S104 is executed, and transmission data from the power supply optical communication device 10a is present in the processing of the step S104. In this case, the control unit 13a controls the data transmission/reception unit 11a to transmit the optical signal of a specific signal pattern to the power reception optical communication device 20a. The data transmission/reception unit 11a generates an optical signal of a specific signal pattern according to the control of the control unit 13a, and transmits the generated optical signal to the optical transmission line 30 (step S401).

The power supply optical communication device 10a transmits an optical signal of a specific signal pattern to an optical transmission line 30 for a fixed time. When the continuous wave light is transmitted from the power supply optical communication device 10a before the transmission data is generated, the control unit 13a stops the transmission of the continuous wave light until the transmission of the transmission data is completed.

The optical signal of the specific signal pattern sent from the power supply optical communication device 10a is received by a power reception optical communication device 20a connected through an optical transmission line 30.

Specifically, the optical signal of a specific signal pattern transmitted from the power supply optical communication device 10a is received by a photoelectric conversion unit 21 of the power reception optical communication device 20a via a communication line. The optical signal receiving unit 21 converts the received optical signal into an electrical signal and outputs the electrical signal to the signal detection unit 24a and the route switching unit 25 (step S402).

After passing for a certain period of time, the control unit 13a generates data of an electric signal from the transmission data and outputs the generated data of the electric signal to the data transmission/reception unit 11a. The data transmission/reception unit 11a generates communication light on the basis of the electric signal of the transmission data output from the control unit 13a. The data transmission/reception unit 11a transmits the generated communication light to an optical transmission line 30 (step S403).

The communication light transmitted from the power supply optical communication device 10a is received by a power reception optical communication device 20a connected via an optical transmission line 30. Specifically, the communication light transmitted from the power supply optical communication device 10*a* is received by a photoelectric conversion unit 21 of the power reception optical communication device 20*a* via a communication line. The optical signal receiving unit 21 converts the received optical signal into an electrical signal and outputs the electrical signal to the signal detection unit 24*a* and the route switching unit 25 (step S404).

The signal detection unit 24*a* acquires the electric signal output from the photoelectric conversion unit 21. The signal detection unit 24*a* always monitors the input electric signal and detects an optical signal indicating transmission of communication light (step S405). It is assumed that the signal detection unit 24*a* detects a specific signal pattern in the input electric signal. In this case, the signal detection unit 24*a* detects the optical signal received via the communication line as an optical signal indicating the transmission of the communication light. Then, the signal detection unit 24*a* controls the output route of the route switching unit 25 to be a first route, and to supply power from the power storage unit 23 to the modulation/demodulation unit 26 (step S406). Thereafter, the processing of step S109 is executed.

In the second embodiment, the processing when there is no transmission data is the same as that shown in FIG. 3 except that the processing of the step S204 and the step S205 in FIG. 3 is replaced with the following processing. The signal detection unit 24*a* acquires the electric signal output from the photoelectric conversion unit 21. The signal detection unit 24*a* always monitors the input electrical signal, and detects the optical signal indicating transmission of communication light. In this case, a signal detection unit 24*a* does not detect a specific signal pattern from the input electric signal. In this case, the signal detection unit 24*a* does not detect the optical signal received via the communication line as an optical signal indicating transmission of the communication light. Then, the signal detection unit 24*a* controls the output route of the route switching unit 25 to be a second route.

According to the optical power supply system 100*a* of the second embodiment configured as described above, the power supply optical communication device 10 transmits the continuous wave light generated by the oscillator 141 to the power reception optical communication device 20*a* when there is no transmission data to the power reception optical communication device 20*a*. The power reception optical communication device 20*a* performs frequency conversion of a radio signal received from an external device 40 by using the continuous wave transmitted from the power supply optical communication device 10*a*. Thus, it is not necessary to generate a continuous wave for frequency conversion in the power reception optical communication device 20*a*. Therefore, power for generating continuous waves can be suppressed. Therefore, it is possible to reduce wasteful power consumption.

Further, the power reception optical communication device 20*a* converts the optical signal input through the communication line into an electric signal, detects a specific signal pattern in the electric signal, and thereby detects the optical signal indicating the transmission of the communication light. Thus, it is not necessary to additionally transmit a control signal from the power supply optical communication device 10, and the sleep state can be released at a timing necessary for the power reception optical communication device 20*a*. Therefore, it is possible to reduce wasteful power consumption.

Further, the power reception optical communication device 20*a* includes a route switching unit 25 for outputting an electric signal based on the optical signal input via the communication line to a route toward the mixer 272 when the specific signal pattern is not detected on the basis of the optical signal input via the communication line. Thus, the electric signal based on the optical signal input through the communication line can be output to the mixer 272 with a simple configuration.

Third Embodiment

In the first embodiment, a configuration in which the signal detection unit detects an optical signal indicating transmission of communication light transmitted from the power supply optical communication device according to whether or not a line spectrum having a constant frequency of an electric signal is described. In the third embodiment, a configuration in which the signal detection unit detects a specific signal pattern to detect an optical signal indicating transmission of communication light transmitted from the power supply optical communication device will be described. In the third embodiment, the presence or absence of a specific signal pattern is detected by an optical signal.

Figure 7:
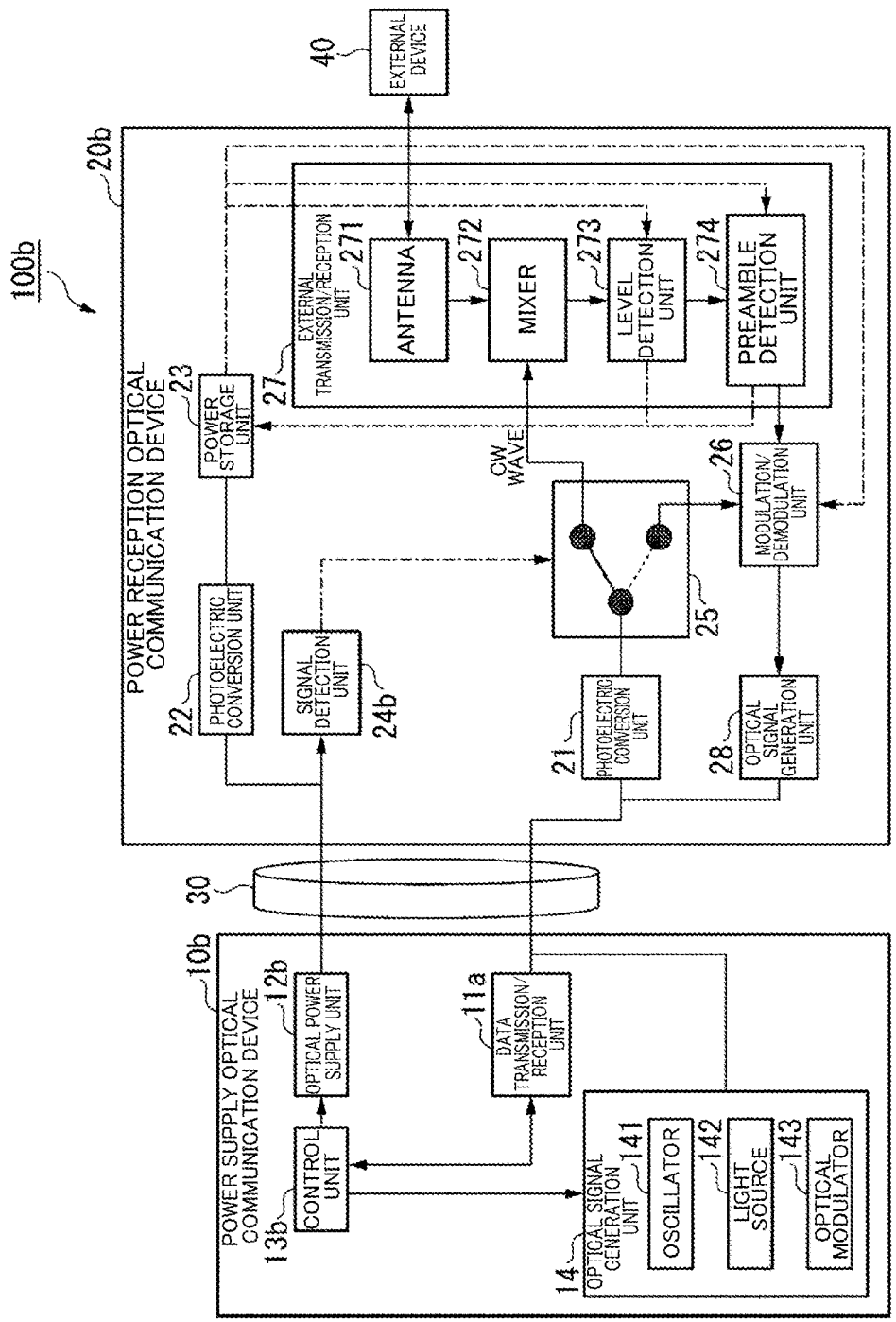
FIG. 7 is a diagram showing an example of the configuration of the optical power supply system according to a third embodiment.

FIG. 7 is a diagram showing an example of a configuration of an optical power supply system 100*b* in the third embodiment. The optical transmission system 100*b* includes a power supply optical communication device 10*b* and a power reception optical communication device 20*b*. The power supply optical communication device 10*b* and the power reception optical communication device 20*b* are connected communicably via an optical transmission line 30. The power supply optical communication device 10*b* and the power reception optical communication device 20*b* are connected via the optical transmission line 30, thereby enabling communication between the power supply optical communication device 10*b* and the power reception optical communication device 20*b*. For example, the power supply optical communication device 10*b* and the power reception optical communication device 20*b* are connected via a power supply line and a communication line, respectively. In FIG. 7, the power supply optical communication device 10*b* and the power reception optical communication device 20*b* have a single star type topology configuration.

Although one power reception optical communication device 20*b* is shown in FIG. 7, the optical power supply system 100*b* may include a plurality of power reception optical communication devices 20*b*. When the optical power supply system 100*b* is provided with a plurality of power reception optical communication devices 20*b*, an optical splitter is provided between the power supply optical communication device 10*b* and the plurality of power reception optical communication devices 20*b*. The optical splitter branches the optical signal transmitted from the power supply optical communication device 10*b* and transmits it to each power reception optical communication device 20*b*. The optical splitter multiplexes the communication device 20*b* and transmits the multiplexed optical signals to the power supply optical communication device 10*b*.

In a third embodiment, a specific signal pattern predetermined between the power supply optical communication device 10*b* and the power reception optical communication device 20*b* is used as an optical signal indicating transmission of communication light. When transmission data is generated, the power supply optical communication device 10*b* transmits an optical signal of a specific signal pattern to the power reception optical communication device 20*b* via the power supply line for a fixed time. At this time, power supply from the power supply optical communication device 10*b* to the power reception optical communication device 20*b* is stopped. Then, the power supply optical communication device 10*b* transmits communication light to the power reception optical communication device 20*b* via the communication line after transmitting the optical signal of the specific signal pattern.

The power reception optical communication device 20*b* monitors the optical signal received via the power supply line. The power reception optical communication device 20*b* sets the output route of the route switching unit 25 as a first route when the specific signal pattern is not detected, and sets the output route of the route switching unit 25 as a second route when the specific signal pattern is detected. Hereinbelow, a specific configuration will be described.

The power supply optical communication device 10*b* includes a data transmission/reception unit 11, an optical power supply unit 12*b*, a control unit 13*b*, and an optical signal generation unit 14.

The power supply optical communication device 10*b* has a different configuration from the power supply optical communication device 10 in that the optical power supply unit 12*b* and the control unit 13*b* are included instead of the memory connection control unit 12 and the control unit 13. The power supply optical communication device 10*b* is similar to the power supply optical communication device 10 in other configurations. Therefore, the description of the entire power supply optical communication device 10*b* will be omitted and the optical power supply unit 12*b* and the control unit 13*b* will be described.

The optical power supply unit 12*b* is provided with a light source for emitting light to the inside, and the power supply light is generated by the light source and transmitted to the optical transmission line 30. Thus, the optical power supply unit 12*b* transmits the power supply light to the power reception optical communication device 20*b*. Further, the optical power supply unit 12*b* generates an optical signal of a specific signal pattern and transmits it to the optical transmission line 30 according to the control of the control unit 13*b*.

The control unit 13*b* controls the operations of the data transmission/reception unit 11, the optical power supply unit 12*b* and the optical signal generation unit 14. For example, when there is transmission data, the control unit 13*b* first transmits an optical signal of a specific signal pattern in the optical power supply unit 12*b* for a fixed time. The control unit 13*b* makes the data transmission/reception unit 11 transmit the communication light after passing for a certain period of time. When there is no transmission data, the control unit 13*b* controls the optical signal generation unit 14 to transmit the continuous wave light. The control unit 13*b* outputs the power supply light from the optical power supply unit 12*b* when there is no transmission data.

The power reception optical communication device 20*b* is driven by power supplied from the power supply optical communication device 10*b* as a power source. The power reception optical communication device 20*b* includes a photoelectric conversion unit 21, a photoelectric conversion unit 22, a power storage unit 23, a signal detection unit 24*b*, a route switching unit 25, a modulation/demodulation unit 26, an external transmission/reception unit 27, and an optical signal generation unit 28.

The power reception optical communication device 20*b* is different in configuration from the power reception optical communication device 20 in that a signal detection unit 24*b* is provided in place of the signal detection unit 24. The power reception optical communication device 20*b* is similar to the power reception optical communication device 20 in other configurations. Therefore, the description of the entire power reception optical communication device 20*b* will be omitted and the signal detection unit 24*b* will be described.

A signal detection unit 24*b* always monitors the optical signal transmitted through the power supply line and detects the optical signal indicating the transmission of the communication light. Specifically, the signal detection unit 24*b* detects an optical signal indicating transmission of communication light by detecting a specific signal pattern. On the other hand, when the specific signal pattern is not detected, the signal detection unit 24*b* does not detect the optical signal transmitted via the power supply line as an optical signal indicating transmission of communication light.

The signal detection unit 24*b* switches the output route of the route switching unit 25 according to the detection result. The signal detection unit 24*b* is, for example, a trigger detector. Communication light is transmitted from the power supply optical communication device 10*b* after an optical signal of a specific signal pattern is transmitted. Thus, the transmission data can be output to an appropriate output route by controlling the output route of the route switching unit 25 after the signal detection unit 24*b* detects the specific signal pattern. The transmission data are transmitted for a prescribed period after the signal detection unit 24*b* detects the specific signal pattern. Therefore, even if a specific signal pattern is not detected during the predetermined period, the signal detection unit 24*b* may detect an optical signal received via a power supply line during the predetermined period as an optical signal indicating transmission of communication light. With this configuration, the output route of the route switching unit 25 is not switched immediately after the specific signal pattern is not detected.

Figure 8:
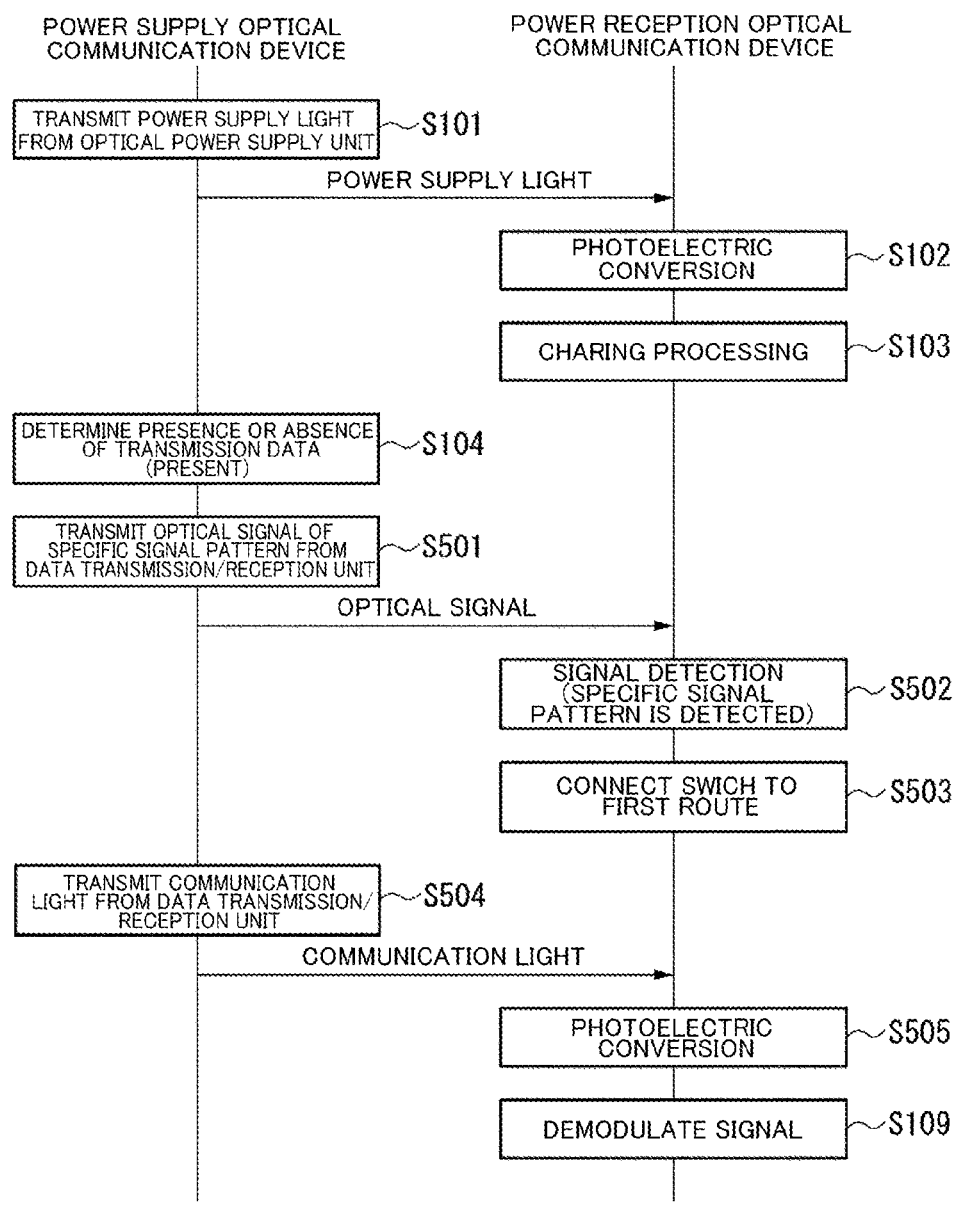
FIG. 8 is the sequence diagram showing the flow of the first processing of the optical power supply system according to the third embodiment.

FIG. 8 is a sequence diagram illustrating a flow of processing of the optical power supply system 100*b* according to the third embodiment. In the processing shown in FIG. 8, the flow of processing when transmission data is present in the power supply optical communication device 10*b* will be described. In FIG. 8, processing similar to that in FIG. 2 is designated by the same reference numerals as in FIG. 2, and will not be described.

It is assumed that processing from the step S101 to the step S104 is executed, and transmission data from the power supply optical communication device 10*b* is present in the processing of the step S104. In this case, the control unit 13*b* controls the optical power supply unit 12*b* to transmit the optical signal of a specific signal pattern to the power reception optical communication device 20*b*. The optical power supply unit 12*b* generates an optical signal of a specific signal pattern according to the control of the control unit 13*b*, and transmits the generated optical signal to the optical transmission line 30 (step S501).

The power supply optical communication device 10*b* transmits an optical signal of a specific signal pattern to an optical transmission line 30 for a fixed time. When the continuous wave light is transmitted from the power supply optical communication device 10*b* before the transmission data is generated, the control unit 13*b* stops the transmission of the continuous wave light until the transmission of the transmission data is completed.

The optical signal of the specific signal pattern sent from the power supply optical communication device 10*b* is received by a power reception optical communication device 20*b* connected through an optical transmission line 30. Specifically, the optical signal of a specific signal pattern transmitted from the power supply optical communication device 10*b* is received by a photoelectric conversion unit 22 and a signal detection unit 24*b* of the power reception optical communication device 20*b* via a power supply line. The signal detection unit 24*b* always monitors the received optical signal and detects an optical signal indicating transmission of the communication light (step S502). It is assumed the signal detection unit 24*b* detects the optical signal of the specific signal pattern from the inputted electric signal. In this case, the signal detection unit 24*b* controls the output route of the route switching unit 25 to be a first route, and to supply power from the power storage unit 23 to the modulation/demodulation unit 26 (step S503).

After passing for a certain period of time, the control unit 13*b* generates data of an electric signal from the transmission data and outputs the generated data of the electric signal to the data transmission/reception unit 11*b*. The data transmission/reception unit 11*b* generates communication light on the basis of the electric signal of the transmission data output from the control unit 13*b*. The data transmission/reception unit 11*b* transmits the generated communication light to an optical transmission line 30 (step S504).

The communication light transmitted from the power supply optical communication device 10*b* is received by a power reception optical communication device 20*b* connected via an optical transmission line 30. Specifically, the communication light transmitted from the power supply optical communication device 10*b* is received by a photoelectric conversion unit 21 of the power reception optical communication device 20*b* via a communication line. The optical signal receiving unit 21 converts the received optical signal into an electrical signal and outputs the electrical signal to the route switching unit 25 (step S505).

In the processing of the step S503, the output route of the route switching unit 25 is a first route. Therefore, the electric signal of the transmission data input to the route switching unit 25 is input to the modulation/demodulation unit 26 via the first route. Thereafter, the processing of step S109 is executed.

Figure 9:
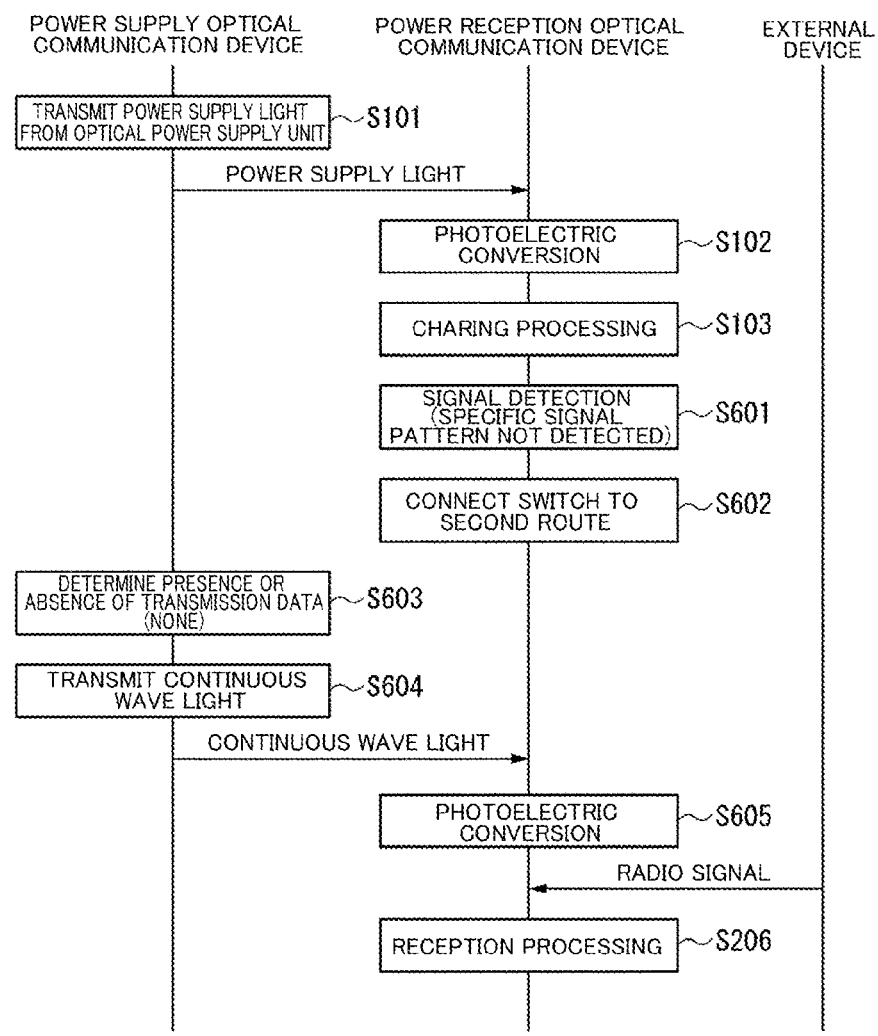
FIG. 9 is a sequence diagram illustrating a flow of the second processing of the optical power supply system according to the third embodiment.

FIG. 9 is a sequence diagram illustrating a flow of second processing of the optical power supply system 100*b* according to the third embodiment. In the process shown in FIG. 9, the flow of the process when there is no transmission data in the power supply optical communication device 10*b* will be described. In FIG. 9, processing similar to that in FIG. 3 is designated by the same reference numerals as in FIG. 3, and will not be described.

In the processing of the step S101, an optical signal transmitted from the power supply optical communication device 10*b* (for example, power supply light) is received by a power reception optical communication device 20*b* connected via an optical transmission line 30. Specifically, the optical signal transmitted from the power supply optical communication device 10*b* is received by a photoelectric conversion unit 22 and a signal detection unit 24*b* of the power reception optical communication device 20*b* via a power supply line. During or after the processing from the step S102 to the step S103 is performed, the signal detection unit 24*b* always monitors the received optical signal and detects an optical signal indicating transmission of communication light (step S601). It is assumed that the signal detection unit 24*b* does not detects the specific signal pattern from the input optical signal. In this case, the signal detection unit 24*b* performs control so as to set the output route of the route switching unit 25 to the second route (step S602).

The control unit 13*b* of the power supply optical communication device 10*b* determines the presence or absence of transmission data while processing of the step S101 is performed (step S603). Here, it is assumed that there is no transmission data. In this case, the control unit 13*b* controls the optical signal generation unit 14 to output continuous wave light from the optical signal generation unit 14. The optical signal generation unit 14 generates continuous wave light according to the control of the control unit 13*b*, and transmits the generated continuous wave light to the power reception optical communication device 20*b* via the optical transmission line 30 (S604).

The continuous wave light transmitted from the power supply optical communication device 10*b* is received by a power reception optical communication device 20*b* connected via an optical transmission line 30. Specifically, the continuous wave light transmitted from the power supply optical communication device 10*b* is received by a photoelectric conversion unit 21 of the power reception optical communication device 20*b* via a communication line. The optical signal receiving unit 21 converts the received optical signal into an electrical signal and outputs the electrical signal to the route switching unit 25 (step S605).

In the processing of the step S602, the output route of the route switching unit 25 is a second route. Therefore, the electric signal of the continuous wave input to the route switching unit 25 is input to the mixer 272 via the second route. Thereafter, the processing of step S206 is executed.

According to the optical power supply system 100*c* of the third embodiment configured as described above, the power supply optical communication device 10*b* transmits the continuous wave light generated by the oscillator 141 to the power reception optical communication device 20*b* when there is no transmission data to the power reception optical communication device 20*b*. The power reception optical communication device 20*b* performs frequency conversion of a radio signal received from an external device 40 by using the continuous wave transmitted from the power supply optical communication device 10*b*. Thus, it is not necessary to generate a continuous wave for frequency conversion in the power reception optical communication device 20*b*. Therefore, power for generating continuous waves can be suppressed. Therefore, it is possible to reduce wasteful power consumption.

Furthermore, the power reception optical communication device 20*b* detects an optical signal indicating transmission of communication light by detecting a specific signal pattern from an optical signal input via a power supply line. Thus, it is not necessary to additionally transmit a control signal from the power supply optical communication device 10*b*, and the sleep state can be released at a timing necessary for the power reception optical communication device 20*b*. Therefore, it is possible to reduce wasteful power consumption.

Further, the power reception optical communication device 20*b* includes a route switching unit 25 for outputting an electric signal based on the optical signal input via the communication line to a route toward the mixer 272 when the optical signal indicating transmission of the communication light is not detected. Thus, the electric signal based on the optical signal input through the communication line can be output to the mixer 272 with a simple configuration.

Fourth Embodiment

In the first embodiment, a configuration in which a radio signal received by an antenna in a power reception optical communication device is down-converted and then a signal level is detected is described. In the fourth embodiment, a configuration in which the signal level of the radio signal received by the antenna is detected and then down-converted in the power reception optical communication device will be described.

Figure 10:
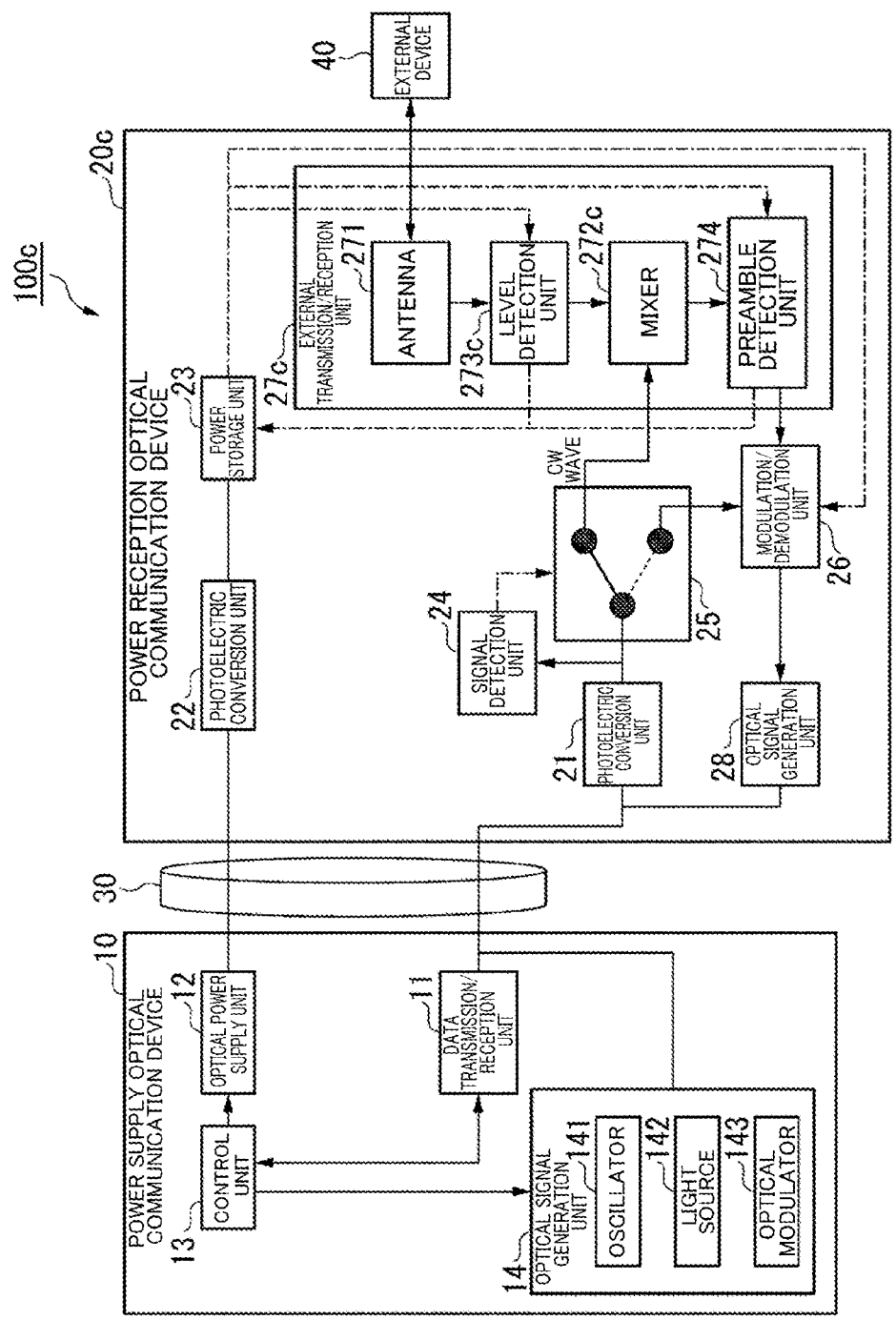
FIG. 10 is a diagram showing an example of the configuration of the optical power supply system according to a fourth embodiment.

FIG. 10 is a diagram showing an example of a configuration of an optical power supply system 100c according to the fourth embodiment.

The optical power supply system 100c includes a power supply optical communication device 10 and a power reception optical communication device 20c. The power supply optical communication device 10 and the power reception optical communication device 20c are connected communicably via an optical transmission line 30. The power supply optical communication device 10 and the power reception optical communication device 20c are connected via the optical transmission line 30, thereby enabling communication between the power supply optical communication device 10 and the power reception optical communication device 20c. For example, the power supply optical communication device 10 and the power reception optical communication device 20c are connected via a power supply line and a communication line, respectively. In FIG. 10, the power supply optical communication device 10 and the power reception optical communication device 20c have a single star type topology configuration.

Although one power reception optical communication device 20c is shown in FIG. 10, the optical power supply system 100c may include a plurality of power reception optical communication devices 20c. When a plurality of power reception optical communication devices 20c is provided in the optical power supply system 100c, an optical splitter is provided between the power supply optical communication device 10 and the plurality of power reception optical communication devices 20c. The optical splitter branches the optical signal transmitted from the power supply optical communication device 10 and transmits it to each power reception optical communication device 20c. The optical splitter multiplexes the communication device 20c and transmits them to the power supply optical communication device 10.

In the fourth embodiment, the configuration of the power reception optical communication device 20c is different from the configuration in the first embodiment. Hereinafter, the configuration of power reception optical communication device 20c will be described.

The power reception optical communication device 20c is driven by power supplied from the power supply optical communication device 10. The power reception optical communication device 20c includes a photoelectric conversion unit 21, a photoelectric conversion unit 22, a power storage unit 23, a signal detection unit 24 a, a route switching unit 25, a modulation/demodulation unit 26, an external transmission/reception unit 27c, and an optical signal generation unit 28.

The power reception optical communication device 20c has a configuration different from that of the power reception optical communication device 20 in that an external transmission/reception unit 27c is provided in place of the external transmission/reception unit 27. The power reception optical communication device 20c is similar to the power reception optical communication device 20 in other configurations. For this reason, the description of the entire power reception optical communication device 20c will be omitted and the external transmission/reception unit 27c will be described.

Figure 11:
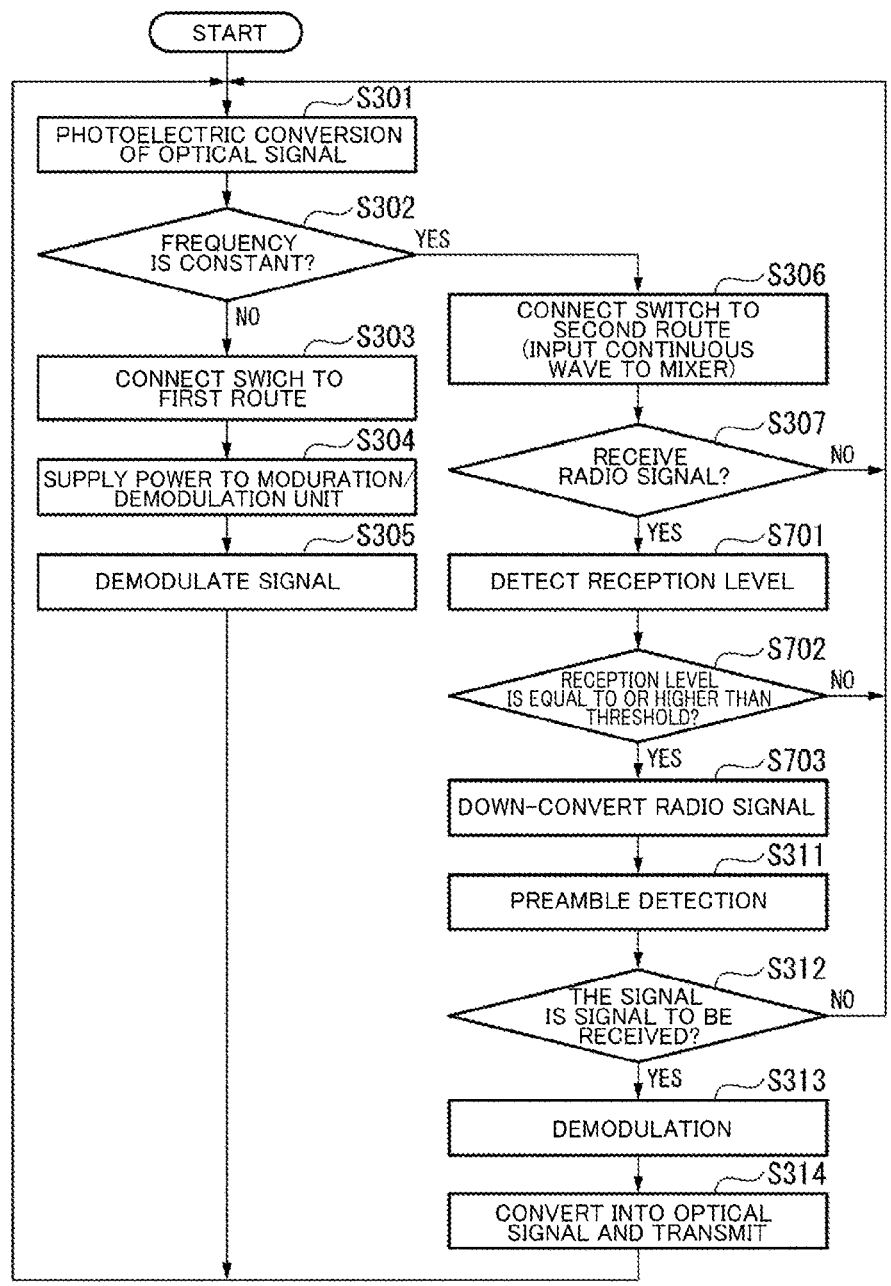
FIG. 11 is a flowchart illustrating the flow of processing of a power reception optical communication device according to the fourth embodiment.
Figure 12:
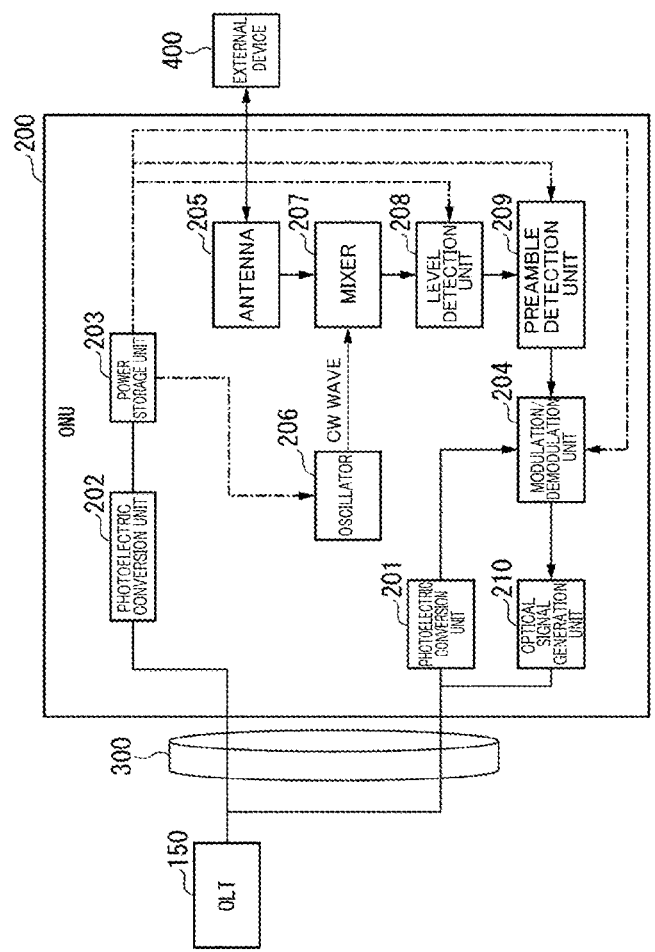
FIG. 12 is a diagram illustrating a configuration example of a conventional an optical power supply system.

FIG. 11 is a flowchart illustrating a flow of processing of the power reception optical communication device 20c according to the fourth embodiment. In the flow chart shown in FIG. 11, the processing of the optical signal received by the photoelectric conversion unit 21 will be mainly described. When a radio signal is received from an external device 40 (step S307: YES) a level detection unit 273c detects a reception level of the received radio signal (step S401). A level detection unit 273c determines whether or not the reception level of the received radio signal is equal to or higher than a threshold (step S702). When the reception level of the received radio signal is less than the threshold value (step S702: NO), the power reception optical communication device 20c executes processing of the step S301.

When the reception level of the received radio signal is equal to or higher than a threshold (step S702: YES), the level detection unit 273c outputs the received radio signal to a mixer 272c. The level detection unit 273c makes the power storage unit 23 supply power to the preamble detection unit 274. The power storage unit 23 supplies power to the preamble detection unit 274 in response to an instruction from the level detection unit 273. Thus, the preamble detection unit 274 starts from the sleep state.

A mixer 272c down-converts the radio signal output from the level detection unit 273 by using an electric signal of a continuous wave (step S703). The mixer 272c outputs the down-converted signal to the preamble detection unit 274. Thereafter, processing is executed from step S311.

According to the optical power supply system 100c configured as described above, effects similar to those achieved in the first embodiment can be achieved.

Furthermore, the optical power supply system 100c performs level detection before down-converting a radio signal received via an antenna 271. Thus, it is not necessary to down-convert all the received radio signals. Thus, the processing load in the power reception optical communication device 20c can be reduced.

The following describes a variation of the optical power supply system 100c in the fourth embodiment.

The power reception optical communication device 20c may detect an optical signal indicating transmission of communication light by the methods shown in the second embodiment and the third embodiment. In such a configuration, the power reception optical communication device 20c has only to replace the configuration other than the external transmission/reception unit 27c with the configuration of the power reception optical communication device 20a or 20b.

The optical power supply system 100, 100a, 100b, 100c in the first to fourth embodiments are not limited to the PON (Passive Optical Network), but may be applied to any system as long as the optical communication system using optical power supply.

In the first to fourth embodiments, the configuration in which the power supply light is transmitted from the power supply optical communication device to the power reception optical communication device through the power supply line as power transmission is shown, but power may be supplied to the power reception optical communication device through a line other than the power supply line. For example, power may be supplied to the power reception optical communication device side by a method of supplying power from a power source battery by loading the power source battery on the power reception optical communication device side, a method of collecting power from the environment (for example, by photovoltaic power generation, vibration power generation, etc.), without using the power supply line.

A part of the function of the power reception optical communication devices 20, 20a, 20b, and 20c in the above embodiments may also be realized using a computer. In such a case, the program to realize their functions may be recorded on a computer-readable recording medium, and the program recorded on the recording medium may be read and executed by the computer system. It is assumed that the "computer system" mentioned here include an OS and hardware such as peripheral devices. Further, the "computer-readable recording medium" represents a transportable medium such as a flexible disk, a magneto-optical disk, a ROM, and a CD-ROM, as well as a storage device such as a hard disk embedded in the computer system. In addition, the "computer-readable recording medium" may also include a recording medium that dynamically retains a program for a short period of time, for example, a communication line used to transmit the program via a network such as the Internet or other communication lines such as a telephone line, and a recording medium that retains the program for a certain period of time, for example, a server or a volatile memory installed within the computer system that serves as a client in that case. Moreover, the program described above may be any of a program for realizing some of the functions described above, a program capable of realizing the functions described above in combination with a program already recorded in a computer system, and a program for realizing the functions using a programmable logic device such as an FPGA (Field Programmable Gate Array).

Although the embodiments of the present invention have been described in detail with reference to the drawings, specific configurations are not limited to these embodiments, and designs and the like within a range that does not deviating from the gist of the present invention are also included.

INDUSTRIAL APPLICABILITY

The present invention is applicable to an optical communication system performing optical power supply.

REFERENCE SIGNS LIST 10, 10a, 10b Power supply optical communication device
20, 20a, 20b, 20c Power reception optical communication device
11, 11a Data transmission/reception unit
12, 12b Optical power supply unit
13, 13a, 13b Control unit
14 Optical signal generation unit
21 Photoelectric conversion unit
22 Photoelectric conversion unit
23 Power storage unit
24, 24a, 24b Signal detection unit
25 Rout switching unit
26 Modulation/demodulation unit
27, 27c External transmission/reception unit
141 Oscillator
142 Light source
143 Optical modulator
271 Antenna
272, 272c Mixer
273, 273c Level detection unit
274 Preamble detection unit

The invention claimed is:

1. An optical power supply system comprising: a power supply optical communication device that supplies power using an optical signal for power supply; and a power reception optical communication device that is driven by power obtained from the optical signal for power supply transmitted from the power supply optical communication device, wherein:
the power supply optical communication device includes one or more processors configured to:
transmit the optical signal for power supply to the power reception optical communication device, and
convert a continuous wave used for frequency conversion of a radio signal received by the power reception optical communication device into an optical signal and transmits the optical signal to the power reception optical communication device; and
the power reception optical communication device includes one or more processors configured to:
convert the optical signal transmitted from the power supply optical communication device into an electric signal of a continuous wave, and
perform frequency conversion on a radio signal transmitted from an external device by using the electric signal of the continuous wave.

2. The optical power supply system according to claim 1, wherein the power supply optical communication device is configured to:
convert data to be transmitted into an optical signal and transmit the optical signal to the power reception optical communication device when there is data to be transmitted to the power reception optical communication device, and
convert the continuous wave into an optical signal and transmit the optical signal to the power reception optical communication device when there is no data to be transmitted to the power reception optical communication device.

3. The optical power supply system according to claim 2, wherein the power reception optical communication device is configured to:
switch an output route in accordance with an optical signal transmitted from the power supply optical communication device,
wherein: when the optical signal transmitted from the power supply optical communication device is an optical signal indicating transmission of the optical signal of the data, the output route is a first route toward a demodulation device that demodulates the data; and
when the optical signal transmitted from the power supply optical communication device is not an optical signal indicating transmission of the optical signal of the data, the output route is a second route for external transmission/reception.

4. The optical power supply system according to claim 3, wherein the power reception optical communication device is configured to:
detect an optical signal indicating transmission of the optical signal of the data based on the optical signal transmitted from the power supply optical communication device, and
switch an output route in accordance with a detection result.

5. The optical power supply system according to claim 4, wherein the power reception optical communication device is configured to:
based on an optical signal transmitted from the power supply optical communication device, when a predetermined signal pattern is detected with the power supply optical communication device or a signal having a constant frequency is not detected, detect the optical signal transmitted from the power supply optical communication device as an optical signal indicating transmission of the optical signal of the data, when the signal pattern is not detected or when a signal having a constant frequency is detected, the optical signal transmitted from the power supply optical communication device is not detected as an optical signal indicating transmission of the optical signal of the data.

6. The optical power supply system according to claim 1, wherein the power reception optical communication device is configured to:

down-convert the radio signal using the continuous wave electrical signal, and detect a level of the signal; and after the radio signal is down-converted, the level of the radio signal is detected, or after the level of the radio signal is detected, the radio signal is arranged in an order that allows down-conversion.

7. An optical power supply method performed by a power supply optical communication device that supplies power using an optical signal for power supply and a power reception optical communication device that is driven by power obtained from the optical signal for power supply transmitted from the power supply optical communication device, comprising:

transmitting, by the power supply optical communication device, the optical signal for power supply to the power reception optical communication device, converting, by the power supply optical communication device, a continuous wave used for frequency conversion of a radio signal received by the power reception optical communication device into an optical signal and transmits the optical signal to the power reception optical communication device, converting, by the power reception optical communication device, the optical signal transmitted from the power supply optical communication device into an electric signal of a continuous wave, and performing, by the power reception optical communication device, frequency conversion on a radio signal transmitted from an external device using the electric signal of the continuous wave.

8. A power reception optical communication device in an optical power supply system including a power supply optical communication device that supplies power using an optical signal for power supply and the power reception optical communication device that is driven by power obtained from the optical signal for power supply transmitted from the power supply optical communication device, comprising one or more processors configured to:

convert an optical signal of a continuous wave used for frequency conversion of a radio signal received by the power reception optical communication device transmitted from the power supply optical communication device into an electric signal of the continuous wave, and perform frequency conversion on a radio signal transmitted from an external device by using the electric signal of the continuous wave.

9. The optical power supply method according to claim 7, comprising:

converting, by the power supply optical communication device, data to be transmitted into an optical signal and transmit the optical signal to the power reception optical communication device when there is data to be transmitted to the power reception optical communication device, and converting, by the power supply optical communication device, the continuous wave into an optical signal and transmit the optical signal to the power reception optical communication device when there is no data to be transmitted to the power reception optical communication device.

10. The optical power supply method according to claim 9, comprising:

switching, by the power reception optical communication device, an output route in accordance with an optical signal transmitted from the power supply optical communication device, wherein:

when the optical signal transmitted from the power supply optical communication device is an optical signal indicating transmission of the optical signal of the data, the output route is a first route toward a demodulation device that demodulates the data; and when the optical signal transmitted from the power supply optical communication device is not an optical signal indicating transmission of the optical signal of the data, the output route is a second route for external transmission/reception.

11. The optical power supply method according to claim 10, comprising:

detecting, by the power reception optical communication device, an optical signal indicating transmission of the optical signal of the data based on the optical signal transmitted from the power supply optical communication device, and switch an output route in accordance with a detection result.

12. The optical power supply method according to claim 11, comprising:

based on an optical signal transmitted from the power supply optical communication device, when a predetermined signal pattern is detected with the power supply optical communication device or a signal having a constant frequency is not detected, detecting, by the power reception optical communication device, the optical signal transmitted from the power supply optical communication device as an optical signal indicating transmission of the optical signal of the data, when the signal pattern is not detected or when a signal having a constant frequency is detected, the optical signal transmitted from the power supply optical communication device is not detected as an optical signal indicating transmission of the optical signal of the data.

13. The optical power supply method according to claim 7, comprising:

down-converting, by the power reception optical communication device, the radio signal using the continuous wave electrical signal, and detect a level of the signal; and after the radio signal is down-converted, the level of the radio signal is detected, or after the level of the radio signal is detected, the radio signal is arranged in an order that allows down-conversion.

14. The power reception optical communication device according to claim 8, wherein the power supply optical communication device is configured to:

convert data to be transmitted into an optical signal and transmit the optical signal to the power reception optical communication device when there is data to be transmitted to the power reception optical communication device, and convert the continuous wave into an optical signal and transmit the optical signal to the power reception optical communication device when there is no data to be transmitted to the power reception optical communication device.

15. The power reception optical communication device according to claim 14, configured to:
   switch an output route in accordance with an optical signal transmitted from the power supply optical communication device,
   wherein: when the optical signal transmitted from the power supply optical communication device is an optical signal indicating transmission of the optical signal of the data, the output route is a first route toward a demodulation device that demodulates the data; and
   when the optical signal transmitted from the power supply optical communication device is not an optical signal indicating transmission of the optical signal of the data, the output route is a second route for external transmission/reception.

16. The power reception optical communication device according to claim 15, configured to:
   detect an optical signal indicating transmission of the optical signal of the data based on the optical signal transmitted from the power supply optical communication device, and switch an output route in accordance with a detection result.

17. The power reception optical communication device according to claim 16, configured to:
   based on an optical signal transmitted from the power supply optical communication device, when a predetermined signal pattern is detected with the power supply optical communication device or a signal having a constant frequency is not detected, detect the optical signal transmitted from the power supply optical communication device as an optical signal indicating transmission of the optical signal of the data,
   when the signal pattern is not detected or when a signal having a constant frequency is detected, the optical signal transmitted from the power supply optical communication device is not detected as an optical signal indicating transmission of the optical signal of the data.

18. The power reception optical communication device according to claim 8, configured to:
   down-convert the radio signal using the continuous wave electrical signal, and detect a level of the signal; and
   after the radio signal is down-converted, the level of the radio signal is detected, or after the level of the radio signal is detected, the radio signal is arranged in an order that allows down-conversion.

\* \* \* \* \*